United States Patent
Cutter et al.

(10) Patent No.: US 9,563,579 B2
(45) Date of Patent: *Feb. 7, 2017

(54) METHOD, APPARATUS, SYSTEM FOR REPRESENTING, SPECIFYING AND USING DEADLINES

(71) Applicant: Intel Corporation, Santa Clara, CA (US)

(72) Inventors: Daniel F. Cutter, Maynard, MA (US); Blaise Fanning, Folsom, CA (US); Ramadass Nagarajan, Hillsboro, OR (US); Ravishankar Iyer, Portland, OR (US); Quang T. Le, Austin, TX (US); Ravi Kolagotla, Austin, TX (US); Ioannis T. Schoinas, Portland, OR (US); Jose S. Niell, Franklin, MA (US)

(73) Assignee: Intel Corporation, Santa Clara, CA (US)

( * ) Notice: Subject to any disclaimer, the term of this patent is extended or adjusted under 35 U.S.C. 154(b) by 366 days.

This patent is subject to a terminal disclaimer.

(21) Appl. No.: 13/780,117

(22) Filed: Feb. 28, 2013

(65) Prior Publication Data

US 2014/0240326 A1   Aug. 28, 2014

(51) Int. Cl.
G06F 13/00 (2006.01)
G06F 9/00 (2006.01)
G06F 13/16 (2006.01)

(52) U.S. Cl.
CPC ............... G06F 13/00 (2013.01); G06F 9/00 (2013.01); G06F 13/1626 (2013.01)

(58) Field of Classification Search
None
See application file for complete search history.

(56) References Cited

U.S. PATENT DOCUMENTS

| 5,923,859 | A   | * | 7/1999  | Melo et al. ............. 710/113 |
| 6,006,303 | A   | * | 12/1999 | Barnaby et al. ......... 710/244 |
| 6,078,998 | A   | * | 6/2000  | Kamel ............... G06F 3/061 |
|           |     |   |         | 348/E5.008 |
| 6,415,369 | B1  | * | 7/2002  | Chodnekar et al. ....... 711/158 |
| 7,673,264 | B1  | * | 3/2010  | Darbinyan ......... G06F 17/5022 |
|           |     |   |         | 716/106 |
| 8,190,804 | B1  | * | 5/2012  | Srinivasan et al. ....... 710/244 |

(Continued)

FOREIGN PATENT DOCUMENTS

| TW | 200401187 | 1/2004 |
| TW | 200413889 | 8/2004 |

OTHER PUBLICATIONS

Lee et.al. "Globally-Synchronized Frames for Guaranteed Quality-of-Service in On-Chip Networks" 2008, IEEE.*

(Continued)

Primary Examiner — Midys Rojas
Assistant Examiner — Tasnima Matin
(74) Attorney, Agent, or Firm — Trop, Puner & Hu, P.C.

(57) ABSTRACT

In an embodiment, a shared memory fabric is configured to receive memory requests from multiple agents, where at least some of the requests have an associated order identifier and a deadline value to indicate a maximum latency prior to completion of the memory request. Responsive to the requests, the fabric is to arbitrate between the requests based at least in part on the deadline values. Other embodiments are described and claimed.

29 Claims, 11 Drawing Sheets

(56) References Cited

U.S. PATENT DOCUMENTS

| | | | |
|---|---|---|---|
| 2002/0124132 A1* | 9/2002 | Haines et al. | 711/112 |
| 2006/0020835 A1* | 1/2006 | Samson et al. | 713/300 |
| 2007/0136503 A1* | 6/2007 | Worrell et al. | 710/240 |
| 2009/0083516 A1 | 3/2009 | Saleem et al. | |
| 2009/0216917 A1* | 8/2009 | Shasha et al. | 710/25 |
| 2010/0005470 A1 | 1/2010 | Simon et al. | |
| 2011/0113204 A1* | 5/2011 | Henriksson et al. | 711/154 |
| 2013/0007386 A1* | 1/2013 | Wolf et al. | 711/158 |
| 2014/0281197 A1 | 9/2014 | Niell et al. | |

OTHER PUBLICATIONS

U.S. Appl. No. 13/248,276, filed Sep. 29, 2011, entitled, "Issuing Requests to a Fabric," by Sridhar Lakshmanamurthy.

U.S. Appl. No. 13/473,833, filed Jan. 13, 2013, entitled, "Controlling Bandwidth Allocations in a System on a Chip (SoC)", by Jose S. Niell.

U.S. Appl. No. 13/473,795, filed Jan. 13, 2013, entitled "Arbitrating Memory Accesses Via a Shared Memory Fabric", by Daniel F. Cutter.

International Searching Authority, "Notification of Transmittal of the International Search Report and the Written Opinion of the International Searching Authority," mailed May 19, 2014, in International application No. PCT/US2014/01355.

Marculescu, et al., "Outstanding Research Problems in NoC Design: System, Microarchitecture, and Circuit Perspectives", Computer-Aided Design of Integrated Circuits and Systems (IEEE), Jan. 2009, vol. 28, Issue 1, 19 pages.

Henkel, et al., "On-chip networks: a scalable, communication-centric embedded system design paradigm" In:VLSI Design (VLSID), 17th International Conference: IEEE, 2004, 7 pages.

Jae W. Lee, Man Cheuk Ng and Krste Asanovic, "Globally synchronized frames for guaranteed quality of service in on chip networks" Computer Architecture, 2008. ISCA '08. 35th International Symposium on Date of Conference: Jun. 21-25, 2008. pp. 89-100.

Taiwan Patent Office, Office Action mailed Mar. 18, 2015, In Taiwanese Patent Application No. 103104734. (With Redacted Translation).

* cited by examiner

METHOD, APPARATUS, SYSTEM FOR REPRESENTING, SPECIFYING AND USING DEADLINES

FIELD OF THE INVENTION

This disclosure pertains to computing systems and in particular (but not exclusively) to such systems including a fabric to couple multiple devices to a memory.

DETAILED DESCRIPTION

Figure 1:
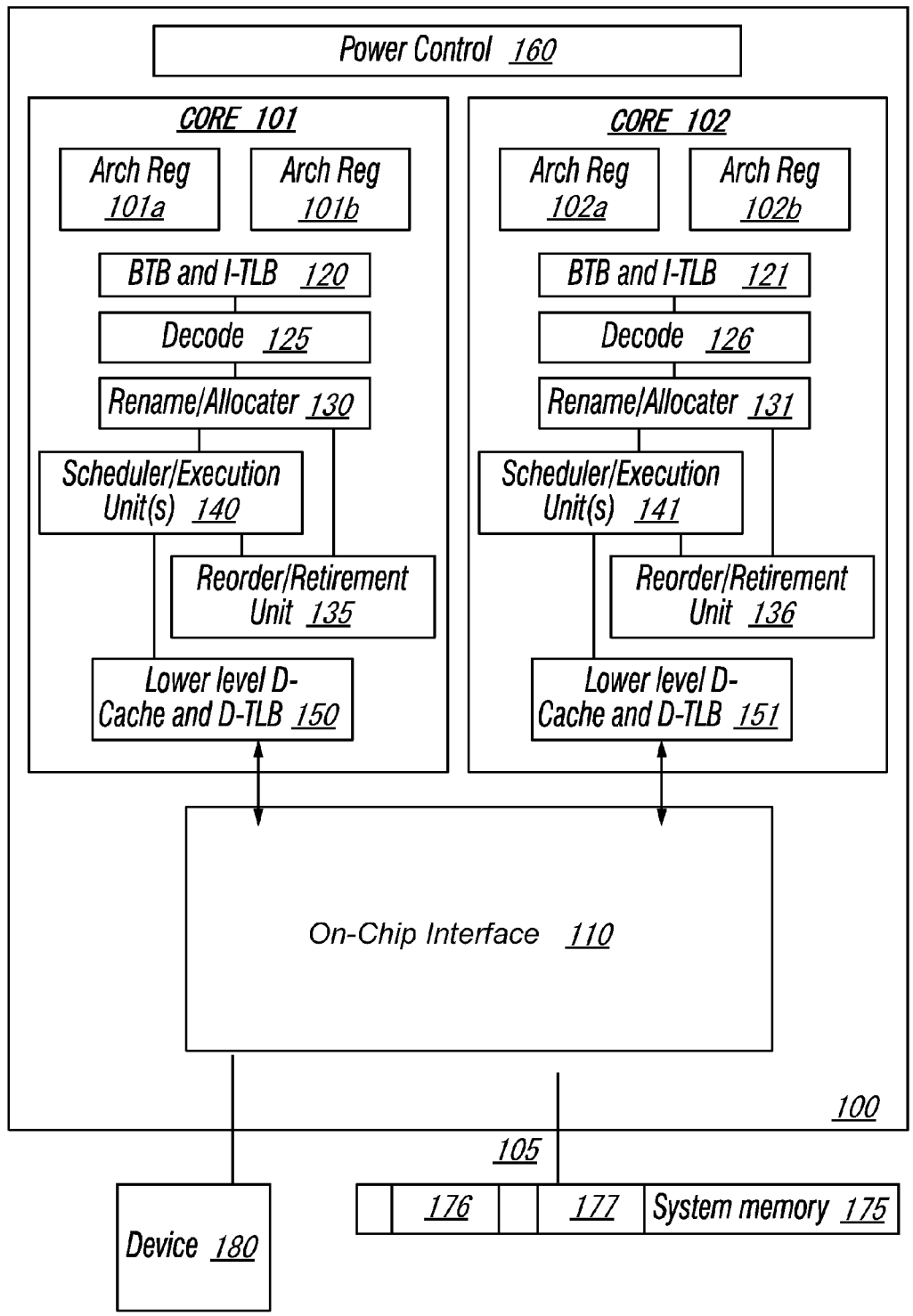
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e., cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101*a* and 101*b*, which may also be referred to as hardware thread slots 101*a* and 101*b*. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101*a*, a second thread is associated with architecture state registers 101*b*, a third thread may be associated with architecture state registers 102*a*, and a fourth thread may be associated with architecture state registers 102*b*. Here, each of the architecture state registers (101*a*, 101*b*, 102*a*, and 102*b*) may be referred to as processing elements, thread slots, or thread units, as described above. As illustrated, architecture state registers 101*a* are replicated in architecture state registers 101*b*, so individual architecture states/contexts are capable of being stored for logical processor 101*a* and logical processor 101*b*. In core 101, other smaller resources, such as instruction pointers and renaming logic in allocator and renamer block 130 may also be replicated for threads 101*a* and 101*b*. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101*a*, 101*b*, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

In various embodiments, a shared memory fabric couples multiple independent devices, also referred to herein as agents, to a shared memory (e.g., via an intervening memory controller). In many embodiments, the shared memory fabric is an interconnect structure of a single die semiconductor device that includes intellectual property (IP) logic blocks of different types, such as a north complex, south complex, multimedia logic, or specific IP logic. The shared memory fabric is configured to enable compliance with quality of service (QoS) requirements for time critical isochronous devices while also providing memory bandwidth proportioning for non-isochronous devices, also referred to herein as best effort devices.

In this way, reliable and predictable allocation and scheduling of memory bandwidth occurs to support multiple devices and device types connected to the shared memory fabric. By including QoS functionality in a common shared memory fabric (rather than a memory controller or other non-fabric circuitry), the design may be more easily reused across multiple semiconductor devices such as system on chips (SoCs) since the design is independent of memory technology.

Embodiments thus perform resource allocation, bandwidth apportioning and time-aware QoS properties in a shared memory fabric to provide predictable and reliable memory bandwidth and latencies to meet the requirements of the devices connected to the fabric.

A class of service category is assigned to each device coupled to the shared memory fabric. In an embodiment, this assignment can be identified using configuration registers of the fabric. Multiple classes of service may be supported by the fabric. Although the scope of the present invention is not limited in this regard, in one embodiment devices of two classes of service categories may be present, including an isochronous class of service category used for latency sensitive devices and a best effort class of service category used for devices that that can tolerate longer latencies to service their requests to memory. Although the scope of the present invention is not limited in this regard, in some embodiments latency sensitive devices include content rendering devices such as audio or video players, camera devices and so forth, while lower priority devices include processor cores, graphics processing units and so forth.

Time, in the form of a request deadline, is communicated from the isochronous devices to the fabric to indicate to the fabric the required latency to complete a request to memory. To enable synchronization, the fabric broadcasts a global timer to all isochronous requesting agents. This global timer is continuously driven on outputs from the fabric so that is available for sampling by the isochronous devices. Responsive to this time value, the agents determine a latency requirement for completion of a request, and add this latency value to the global timer value to form a deadline for the request. As an example, the latency for a read can be determined by the amount of data in the agent's data buffer and the drain rate of the buffer by the agent. If the agent consumes 1 cache line of data every 250 nanoseconds (ns) and has 8 cache lines of data in the buffer, the required deadline for a new request would 8×250 ns or 2 microseconds (us) before the buffer is empty. Based on this communicated latency or deadline value, the fabric may make better scheduling decisions based on knowledge of the current power state of the memories and the required latencies for other unscheduled memory requests pending in the fabric. This deadline communication may improve memory bandwidth and also save system power.

The use of request deadlines provides the fabric with latency information for each request from an isochronous device. Configuration registers programmed within the fabric provide the fabric with information about the memory configuration such as the latency required for the memories to exit a low power, e.g., self-refresh, state. The fabric also controls when the memory controller causes the attached memory to enter and exit the self-refresh state by sending an indication to the memory controller, e.g., in the form of a status channel. The fabric determines when the memories should enter and exit self-refresh by evaluating the latency requirements for all pending memory requests. Because the fabric has knowledge of the required latency for all pending memory requests and required latency to exit self-refresh, greater management of power state transitions of the memories may result in power savings.

Embodiments may also provide for efficiency in memory bandwidth by allowing memory requests to be scheduled out of order; however this may result in long scheduling latencies for some requests. To resolve such concern, the fabric assigns a priority level to each isochronous memory request, e.g., a high or low priority. When scheduling high priority isochronous requests the amount of out of order scheduling allowed is less than what is acceptable when scheduling best effort or low priority isochronous requests. Limiting the amount of out-of-order scheduling for high priority requests is done in order to ensure that the request latency requirement is met. Because request priority is determined from the deadline of the request, the fabric can determine immediately after a request is scheduled what the priority levels of other pending requests are for an isochronous device. Using the deadline method, the priority level of all pending requests only change when the global timer increments.

This latency is the time for completing a request from an isochronous device. This is so, as many isochronous devices have finite data buffer resources that cause the shared memory fabric to service requests from these devices with a latency guarantee to prevent an underflow or overflow of these data buffers.

In an embodiment, an isochronous device determines the required latency to complete a request based on its knowledge of an access rate of a data buffer (such as a drain or fill rate), the size of the data buffer, and number of available entries left in the data buffer. Of course in other embodiments additional or different information can be taken into account in determining an appropriate latency. Depending on the implementation of the isochronous device, several methods can be used to determine a deadline value for the request.

In one embodiment, deadlines are specified as an absolute value and may be derived by adding the required latency for a request (a latency value) to a global timer value that is broadcast to all isochronous devices. In this way, each request can be tagged with a unique deadline value. This allows the shared memory fabric to distinguish latency critical requests from non-critical requests from the same device. This deadline-based technique improves memory scheduling as compared to fixed or varying priority levels for a device and can provide lower latency guarantees, better power efficiency of the memory, and improve overall memory bandwidth.

Figure 2:
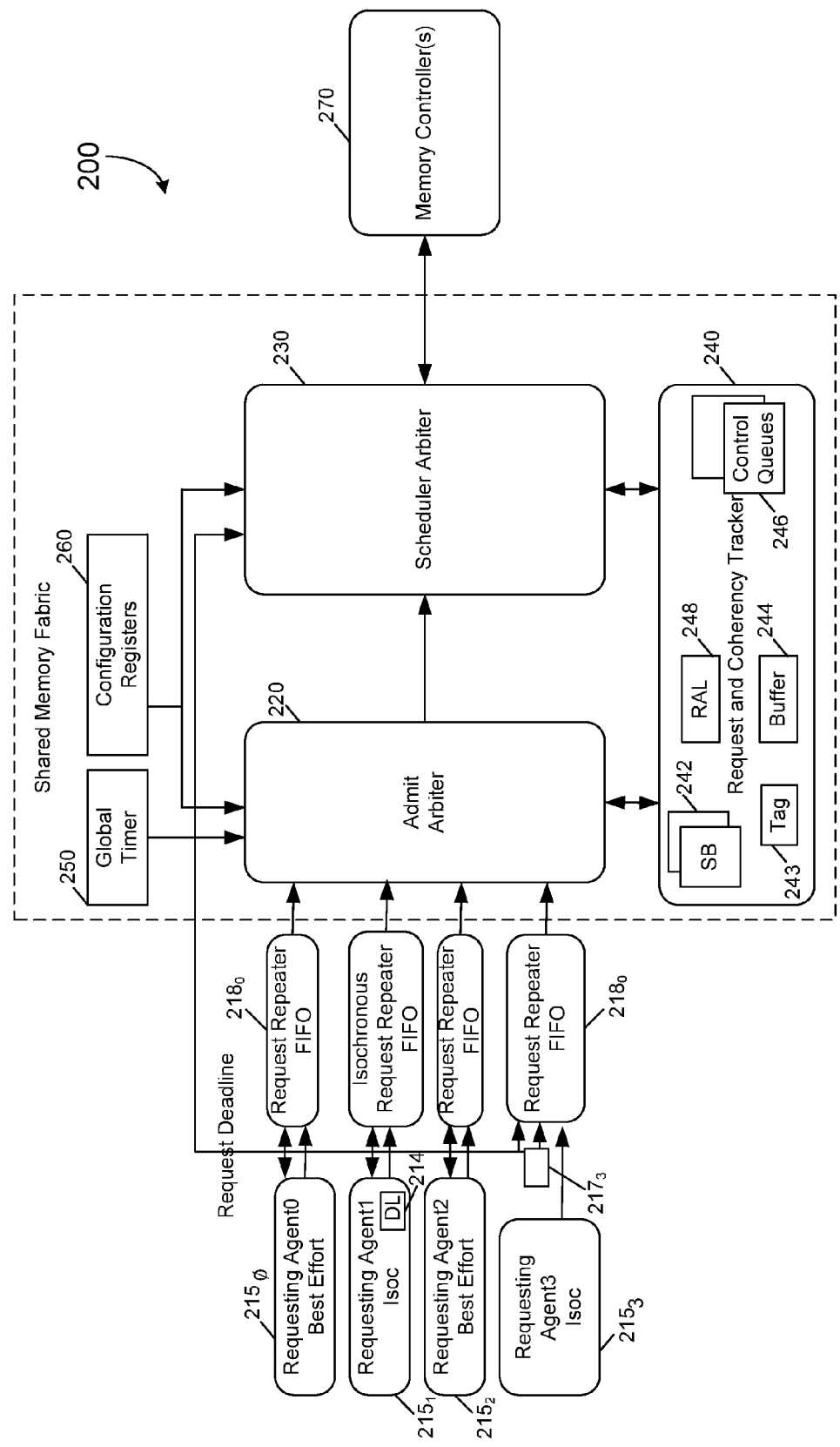
FIG. 2 is a block diagram of a portion of a shared memory fabric in accordance with an embodiment of the present invention.

Referring now to FIG. 2, shown is a block diagram of a portion of a shared memory fabric in accordance with an embodiment of the present invention. As shown in FIG. 2, a shared memory fabric 200 is coupled between a plurality of devices or agents $215_0$-$215_3$ (generically agent 215) and a memory controller 270. Note that in some embodiments more than one memory controller is present. Of course while not shown for ease of illustration understand that the memory controller is coupled to a system memory such as a dynamic random access memory (DRAM) or other system memory.

In the embodiment shown in FIG. 2, different types of agents are coupled to shared memory fabric 200. Specifically, the different agents include a first class of service (COS) agent type, namely isochronous agents and a second class of service agent type, namely best effort COS agents. As seen, each of the agents 215 may communicate request information to an admit arbiter 220. In turn, admit arbiter 220 can communicate corresponding control type information back to the agents. In addition, the isochronous agents (namely agents $215_1$ and $215_3$ in the embodiment of FIG. 2) further include an additional link to communicate request deadline information to admit arbiter 220. To this end, these agents are further configured to receive global timing information from a global timer 250, also coupled to both admit arbiter 220 and a scheduler arbiter 230. In the embodiment shown in FIG. 2, a first isochronous agent $215_1$ includes a deadline logic 214 that can generate a deadline value as described herein. As one such example, this isochronous device may be an IP block of a vendor of the SoC, and the SoC vendor incorporates deadline logic as described herein into the device during the design stage. Instead for other types of isochronous devices such as agent $215_3$, which may be an IP block of a third party vendor, an interface logic $217_3$ that couples to agent $215_3$ may include deadline logic as described herein. In this example, the SoC vendor may provide this interface logic as a gasket layer to interface this third party logic with the remainder of the SoC.

Note that in the embodiment shown in FIG. 2, request repeater first in first out (FIFO) buffers $218_0$-$218_3$ may be provided between a corresponding agent and admit arbiter 220, e.g., in instances where there may be routing issues on chip. However, understand that the presence of these repeater FIFOs are optional and may not be present in some embodiments.

In the embodiment of FIG. 2, admit arbiter 220 may be configured to receive incoming requests from agents 215 (and request deadline information from isochronous agents) and to select appropriate requests to admit to scheduler arbiter 230. To aid in its arbitration process, admit arbiter 220 receives configuration information from a set of configuration registers 260, further coupled to scheduler arbiter 230. In addition, a request and coherency tracker 240 may be coupled to arbiters 220 and 230. In general, tracker 240 may include multiple scoreboards 242, a data buffer 244 and corresponding address tag storage 245, control queues 246 and other resources such as various buffers, logic such as resource allocation logic 248, and so forth. In some implementations, the tag array and data buffer may be located elsewhere than the tracker. Although shown at this high level in the embodiment of FIG. 2, understand the scope of the present invention is not limited in this regard.

The shared memory fabric may include certain finite resources that are first allocated before a request from a requesting agent can be granted by the admit arbiter. These resources include available entries in the internal data buffer and address tag storage. Other finite resources include available entries in the memory scheduler and request tracker scoreboards. There is a one-to-one correspondence in resources for the fabric's internal data buffer, tag array and memory scheduler scoreboard. In an embodiment, these resources are allocated to a predetermined region (e.g., a cache line width such as 64 bytes) of memory. Each active request is also allocated its own entry in the request and coherency tracker, but multiple requests to the same region in memory share the same entry in the data buffer, tag array and memory scheduler scoreboard. Although it is possible for more than one request to be allocated to the same data buffer, tag array, and scheduler scoreboard entry, only one read request is scheduled to the memory controller for all outstanding read requests in the request and coherency tracker.

The request interface for all devices connects to the admit arbiter of the fabric, in an embodiment. Isochronous devices use the deadline field of the request bus to indicate to the fabric the required latency to complete the request. For each request to be sent to the fabric, the isochronous device, e.g., in a deadline logic, determines the required latency for the request to complete and adds the value to the current value of the global timer in order to create the request deadline. Different methods may be used by different isochronous devices to determine the required latency for the request, but all isochronous devices indicate to the fabric the request latency using a deadline field of the request interface in one embodiment.

In an embodiment, the admit arbiter has two levels of priority. There is a high priority path in the admit arbiter that is used for urgent isochronous requests. A request is considered urgent if the requesting agent is configured as an isochronous agent and the deadline field of the request is less than a value stored in a configuration register specifying a threshold value, referred to an urgency threshold value. The admit arbiter also has a low priority path used for best effort requests and for isochronous requests that are not considered urgent. The final level of arbitration is done using a priority selector that selects between the winner of the high priority arbitration and the winner of the low priority arbitration.

In one embodiment, the admit arbiter final selector has two modes that can be selected using a configuration register. The first mode is a fixed priority mode in which, assuming at least one high priority request is present at the input of the admit arbiter, the selector chooses the winner of the high priority arbitration path before choosing the winner of the low priority arbitration path. The second mode of the final selector is a weighted round robin mode in which the selector switches between granting the high priority path and granting the low priority path after N number of high priority requests are granted. The selector then grants M number of low priority requests from the winner of the low priority path before switching back to granting requests from the high priority path. In an embodiment, the values for N and M are specified using configuration registers.

Referring now to Table 1, shown is a global timer and deadline format in accordance with an embodiment of the present invention.

TABLE 1

| 11 Bit Timer | 10 | 9 | 8 | 7 | 6 | 5 | 4 | 3 | 2 | 1 | 0 | Sent From Shared Memory Fabric (Range 0-511.75 usec) |
|---|---|---|---|---|---|---|---|---|---|---|---|---|
| 10 Bit Latency Value | | 9 | 8 | 7 | 6 | 5 | 4 | 3 | 2 | 1 | 0 | Known Internally To Device (Range 0-255.75 usec) |
| 11 Bit Request Deadline | 10 | 9 | 8 | 7 | 6 | 5 | 4 | 3 | 2 | 1 | 0 | Sent From Device To Fabric (Range 0-511.75 usec) |

As shown in Table 1, the global timer may be an 11 bit value that is sent from the shared memory fabric to all devices. In turn, each device has an internal latency value which in an embodiment is 10 bits. From these two values, the device can thus generate a deadline request that in an embodiment is 11 bits. For example, logic of the device (or within an interface logic either of the device or coupled to the device) can add the latency value to the global timer value to obtain a deadline value.

In one embodiment, the global timer is a free running binary counter that increments at a known fixed time interval. The time interval being used is known to all isochronous devices in order to correctly calculate the deadline values for memory requests. The global timer has one extra bit of precision greater than the maximum offset that can be specified for the deadline value of a request, in one embodiment. This extra bit of precision may be used in order for the shared memory fabric to determine if the deadline for the request is a positive or negative value. The global timer is reset to 0 by the system reset and is incremented by 1 at the fixed time interval in one embodiment. When the global timer reaches its maximum value of all 1's, the timer wraps back to 0. When the isochronous device calculates the deadline value, the upper bits of the deadline may be truncated so that the maximum width of the deadline value returned to the shared memory fabric is the same width as the global timer width, namely 11 bits in the embodiment of Table 1.

Thus to create the deadline value, the isochronous device calculates the latency requirement for the request and adds this latency value to the global timer that is broadcast to all isochronous devices from the shared memory fabric. The maximum latency that an isochronous device can specify is half of the maximum range of the global timer, in an embodiment.

One example of calculating a deadline value is as follows: assume the global timer width is specified to be 11 bits as in Table 1 above. The time interval used to increment the global timer is 250 nanoseconds (ns). This gives the global timer a range of 0-7 FF hex, or in time units a range of 0-511.75 microseconds (usec). Using an 11 bit global timer, the maximum deadline value can only be 10 bits. Therefore, the maximum offset that an isochronous device is allowed to specify in this example is 255.75 usec.

The example following below shows how an isochronous device calculates a request deadline for a request where the required latency of the request is 5 us, using a global timer that is 11 bits and incremented every 250 ns.

Current Global Timer value=7 FEhex

Request Latency requirement=5 us=14 hex

Deadline Value=7 FEhex+14 hex=802 hex=002 hex
truncated deadline sent to the fabric with the request.

The example following shows how the isochronous device calculates a request deadline for a request where the required latency of the request is 255 us, using a global timer that is 11 bits and incremented every 250 ns.

Current Global Timer value=7 FEhex

Request Latency requirement=256 us=3 FFhex

Deadline Value=7 FEhex+3 FFhex=BFDhex=3
FDhex truncated deadline sent to the fabric with the request.

In an embodiment, a request sub-channel is used to initiate memory transactions from a device to the shared memory fabric. Other sub-channels of the interface to the shared memory fabric include a data-in sub-channel used for read data return and a data-out sub-channel used for write data. Request fields according to one embodiment are shown below in Table 2.

TABLE 2

| Field Name | Description |
| --- | --- |
| Irdy | Indicates that the Requester is ready to send a request. |
| Trdy | Indicates that the Responder is ready to receive a request. |
| Cmd | Encoded command associated with the request. Example: Read, Write, Snoop Read, or Snooped Write |

TABLE 2-continued

| Field Name | Description |
| --- | --- |
| OrderID | Order information tagged to the request. OrderID is independent per Requestor. Example, Device A can use OrderID = 0 and Device B can simultaneously use Order ID = 0 |
| Deadline | Deadlines are expressed as absolute time in the future. Deadline is calculated based on the broadcast global timer. |
| Address | The associated address for the request. |

Using an embodiment of the present invention, with the inclusion of request deadlines and order identifiers (IDs), some requests from a device can be scheduled as having greater urgency than other requests from the same device. As such, individual requests can be identified as having different priority levels. For example a device can send different order IDs with different requests. As such, a device can send a first group of one or more requests (e.g., low priority requests) using one order ID and corresponding deadline times that indicate long required latencies. Later it can send a second group of one or more requests (e.g., high priority or urgent requests) using a different order ID and deadline times indicating very low required latencies. Using this deadline information the shared memory fabric can distinguish the urgent requests from the low priority requests and schedule those requests first in-order to provide the shortest possible latency for these requests. Later it can switch to scheduling the low priority requests using an out of order scheduling algorithm that is optimized to maximize the memory bandwidth for the requests.

In contrast, using the same priority level for requests from a single device prevents a fabric from differentiating urgent requests from non-urgent requests from the device. And, use of a separate priority status channel to indicate pending urgent requests in the fabric may affect the priority level for all requests from the device, as the fabric is unable to determine which requests are urgent, and thus it treats all requests as if they are high priority. This approach results in much longer latencies to schedule urgent requests for a device and can result in lower total memory bandwidth.

Use of an order ID field sent with request may thus indicate to the fabric that it can return data to a device out of order. For memory requests sent from a device that have the same order ID, the data is returned to the requesting device in the same order in which the requests were received. For devices that only generate requests using one order ID, all data is returned to the devices in the same order that the requests were received. For devices that use multiple order IDs, data may be returned out of order. That is, read data returned for requests of one order ID are allowed to pass data for requests for a different order ID.

An example of using the order ID field for returning data to the device is shown below in Table 3. In this example a device sends a sequence of requests using three different order ID values. The fabric may return data out of order for requests that have different order IDs, but return data in the same order that the requests were sent for requests having the same order ID.

TABLE 3

| Order in which requests are sent from device: |
| --- |
| Request 1 = Memory Read, Address 0x100, Order ID 0, Request Deadline = 0x45; |
| Request 2 = Memory Read, Address 0x200, Order ID 1, Request Deadline = 0x10; |

TABLE 3-continued

Request 3 = Memory Read, Address 0x300, Order ID 2, Request Deadline = 0x2c;
Request 4 = Memory Read, Address 0x180, Order ID 0, Request Deadline = 0x46;
Request 5 = Memory Read, Address 0x280, Order ID 1, Request Deadline = 0x10;
Request 6 = Memory Read, Address 0x380, Order ID 2, Request Deadline = 0x2d.

Order in which data may be returned to device:

Request 2 = Memory Read, Address 0x200, Order ID 1;
Request 5 = Memory Read, Address 0x280, Order ID 1;
Request 3 = Memory Read, Address 0x300, Order ID 2;
Request 6 = Memory Read, Address 0x380, Order ID 2;
Request 1 = Memory Read, Address 0x100, Order ID 0;
Request 4 = Memory Read, Address 0x180, Order ID 0.

To enable the shared memory fabric the ability to provide predictable worst case latency guarantees when scheduling isochronous memory requests, certain rules may be defined for specifying deadlines for requests originating from the same device. In one embodiment, if a device uses deadlines and in-order read returns, then the deadline on each incoming request is equal to or greater than the deadline of the previous request with the same order ID. Requests from a device having different order IDs do not have to follow this rule. Similarly, in an embodiment if a deadline value for a request is less than a deadline value of a previous request with the same order ID, the shared memory fabric is unable to guarantee that it will meet the deadline for the later request. This is due to the fact the memory scheduler schedules requests based on the deadline value. If a previous request with the same order ID had a greater deadline value, it may be scheduled after the request with the shorter deadline. Since the request and coherency tracker returns all read data in order for the same order ID, the previous request blocks returning data for the later request until data from the previous request is returned from the memory controller.

Isochronous devices calculate the deadlines for memory requests based on their knowledge of buffer size and access (e.g., drain/fill) rates of internal data buffers, as discussed above. One advantage of using this deadline method is that devices can adapt to changes in device configuration and modify their deadline calculations. Changes to a device's configuration such as done by a device driver may change the drain or fill rate of the device's internal data buffer. An example is a display driver that changes a display resolution to a higher or lower resolution, which affects the drain rate of the display buffers. Using a deadline technique as described herein if the configuration of the device changes, the device can modify the deadline calculation to accommodate the changes without the shared memory fabric being aware of the changes.

Figure 3:
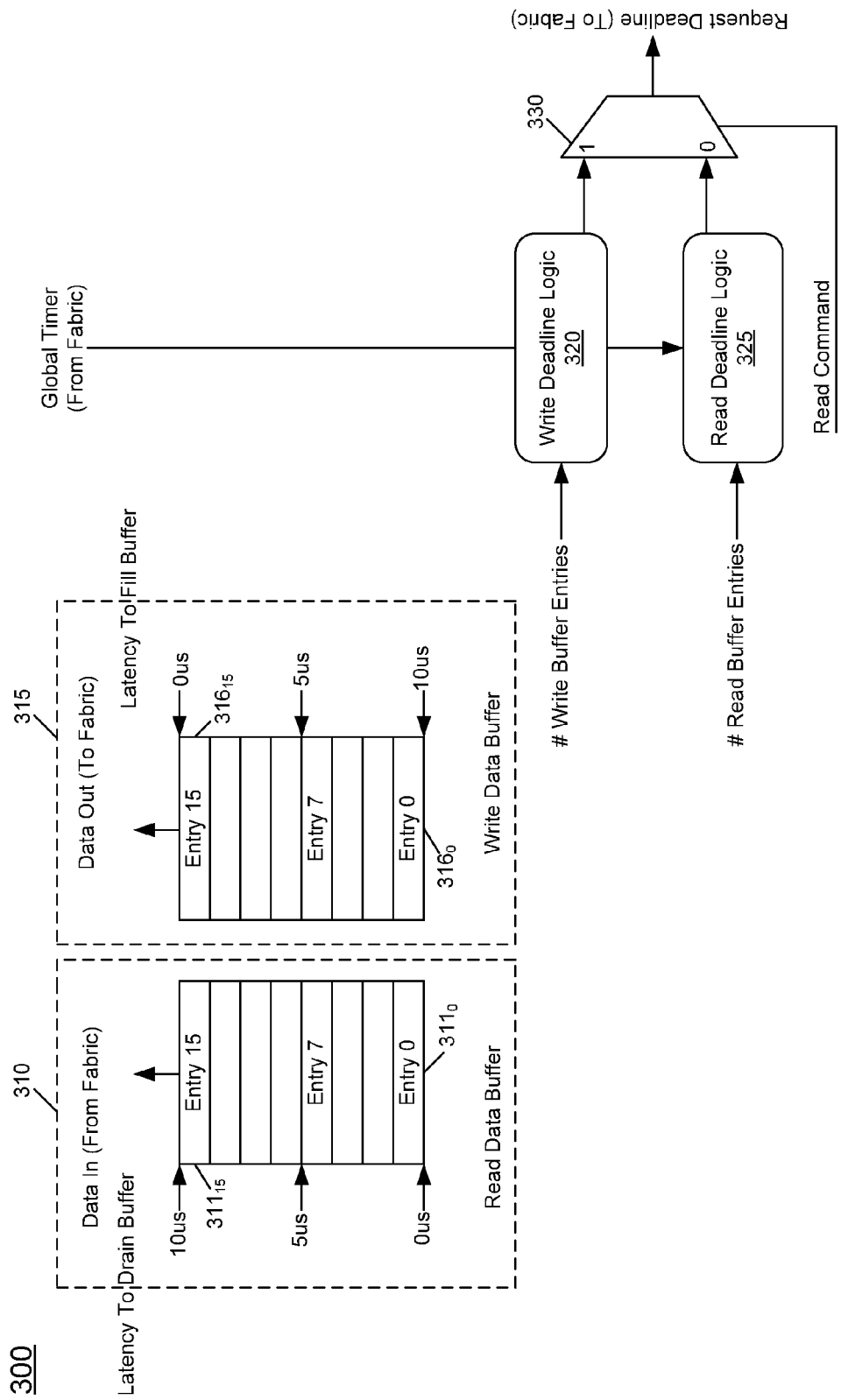
FIG. 3 is a block diagram of a portion of an SoC in accordance with an embodiment of the present invention.

Referring now to FIG. 3, shown is a block diagram of a portion of an SoC in accordance with an embodiment of the present invention. As shown in FIG. 3, the SoC portion 300 includes data buffers 310 and 315 which in the embodiment shown are configured as a read data buffer and a write data buffer, respectively. In an embodiment, these buffers may be implemented within an independent device of the SoC. However, understand the scope of the present invention is not limited in this regard and in other embodiments these buffers (and device) may be located off-chip.

As an example, an IP block may be a display device (or control logic for such device) that has different buffers for different so-called pipes. In such example, each of these different buffers may have different access rates such as drain and/or fill rates to effect display of different types of information on the associated display. To this end, memory requests associated with each of these different buffer types may have a different order ID associated therewith to indicate that the memory requests for the given display type are to have different relative priorities.

As seen, data buffer 310 is configured as a Data-In buffer to receive incoming data from the shared memory fabric. In the implementation shown, a 16 entry buffer is present including a plurality of entries $311_0$-$311_{15}$. In an example in which an entry from this buffer is drained every 0.625 us, consuming 8 entries consumes 5 us and consuming all 16 entries consumes 10 us.

Similarly, data buffer 315 is configured as a Data-Out buffer to provide data to the shared memory fabric. In this implementation, a 16 entry buffer is present including a plurality of entries $316_0$-$316_{15}$. In an example in which an entry from this buffer is drained every 0.625 us, consuming 8 entries consumes 5 us and consuming all 16 entries consumes 10 us.

As further shown in FIG. 3, deadline logic may be associated with each of these buffers. Specifically, a write deadline logic 320 is associated with write data buffer 315 and a read deadline logic 325 is associated with read data buffer 310. As seen, each of these logics receives an input corresponding to the number of available buffer entries. In addition, each of these logics receives the value of the global timer. Based on this information, each logic may generate a request deadline for a corresponding read or write request. These values may be communicated to a selector 330 that is controlled via a read command signal to thus cause a selected one of these request deadline values to be sent to the fabric. Although shown at this high level in the embodiment of FIG. 3, understand the scope of the present invention is not limited in this regard.

Some isochronous devices may use FIFO buffers to buffer the data being transferred between the device and the shared memory fabric. In the case where the device has a fixed drain rate for read data, a calculation may be performed to specify the deadline values that are sent with the memory requests.

As an example, consider a FIFO-based device with a 16-deep FIFO that drains in 10 us. Assume this device consumes the data from one entry of the FIFO every 0.625 us. If the FIFO contains 8 entries worth of data, then data for a new request issued in the current cycle is not expected to be consumed until after 5 us has elapsed (8*0.625 us). Therefore the deadline for the new request is 5 us into the future. In an embodiment, read deadlines for FIFO based devices may be computed as follows according to EQ. 1:

$$\text{Deadline} = \text{Current Global Time} + \text{Drain Rate} * (\text{\#valid FIFO entries}) - \text{Slack} \quad [\text{EQ. 1}]$$

In the above EQ. 1, #valid FIFO entries corresponds to the sum of the number of FIFO entries that already have data and the number of outstanding read requests, and Slack corresponds to a device-specific allowance to accommodate additional latencies within the device while issuing request and/or consuming data. An example of such a slack would be the arbitration time for multiple sub-requestors within the device.

For the device described above, when the FIFO is initially empty a new request will have its deadlines set to the current global time, indicating to the shared memory fabric the device can consume the data immediately. As requests are sent to the fabric and as the reads complete and fill the FIFO, new requests will accumulate some latency. For example, when the FIFO has 8 entries worth of data, a new request will have the deadline (Current Global Time+5 us). When the FIFO is full, a new request will have the deadline (Current Global Time+10 us).

Deadlines for write requests can be calculated similarly according to EQ. 2:

Deadline=Current Global Time+Fill Rate*(FIFO Size−#valid FIFO entries)−Slack  [EQ. 2]

The above equation assumes that a device fills a FIFO. The write data is pulled by the shared memory fabric before the FIFO fills up. The variable #valid FIFO entries corresponds to the number of FIFO entries that already have data waiting to be written. In this case if the FIFO size is again 16 with a fill rate of 0.625 us, when the device sends the first write request the latency for the request would be 0.625*(16−1)=9.375 us.

Figure 4:
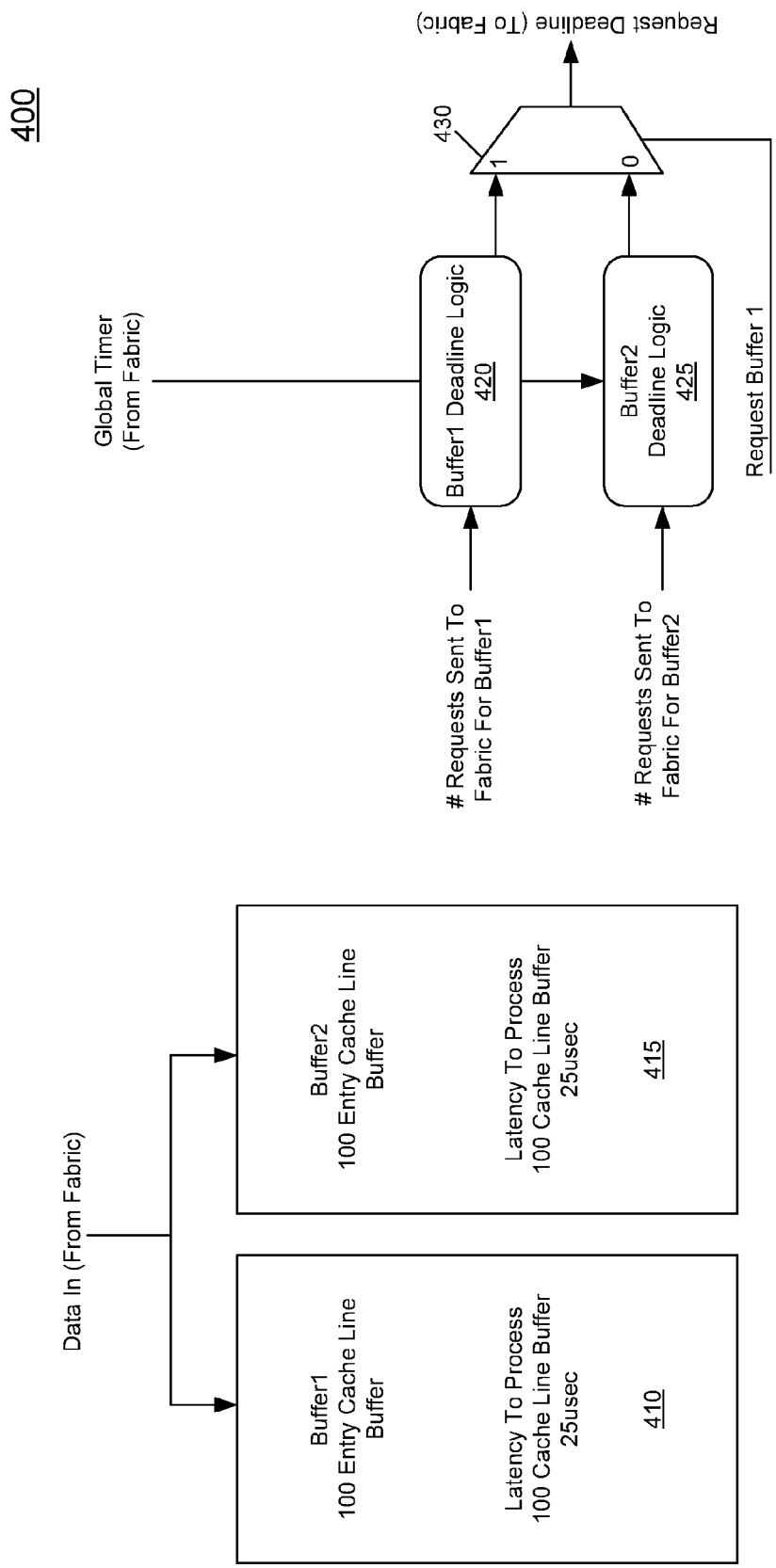
FIG. 4 is a block diagram of another portion of an SoC in accordance with another embodiment of the present invention.

Referring now to FIG. 4, shown is a block diagram of another portion of an SoC in accordance with an embodiment of the present invention. As shown in FIG. 4, the SoC portion 400 includes data buffers 410 and 415 which in the embodiment shown are configured as dual buffers. In an embodiment, these buffers may be implemented within an independent device of the SoC. However, understand the scope of the present invention is not limited in this regard and in other embodiments these buffers (and device) may be located off-chip.

As seen, both first buffer 410 and second buffer 415 are configured as 100 entry cache line buffers having a latency of 25 us to process all 100 entries. As further shown in FIG. 4, deadline logic may be associated with each of these buffers. Specifically, a first deadline logic 420 is associated with first buffer 410 and a second deadline logic 425 is associated with second buffer 415. As seen, each of these logics receives an input corresponding to the number of requests sent to the fabric for the corresponding buffer. In addition, each of these logics receives the value of the global timer. Based on this information, each logic may generate a request deadline for a corresponding read request. These values may be communicated to a selector 330 that is controlled via a buffer control signal to thus cause a selected one of these request deadline values to be sent to the fabric. Although shown at this high level in the embodiment of FIG. 4, understand the scope of the present invention is not limited in this regard.

Another potential usage for deadline scheduling is where an isochronous device requires a large amount of data before it can begin processing any data returned from the fabric. As one such example, a camera or other image capture processing engine may include such buffers. In this type of design the device may use a double buffer approach for storing the data. Using this approach, one buffer is to be completely full so the device can begin processing the data from that data buffer. When a buffer becomes free, due to the device completing processing of the data, the fabric completes all memory requests to fill that buffer before the device finishes processing the data in the other buffer.

Consider a device with two data buffers that each store 100 cache lines. Assume as one example that it takes the device 25 us to process the data in one of these buffers. To satisfy the latency requirement, the fabric returns data every 250 ns on average (25 us/100). The deadline for a new request is therefore dependent on the time when the first request was sent and the number of outstanding requests. In an embodiment, deadlines for this type of device may be computed as follows according to EQ. 3:

Deadline=Global Time at first request+Request Rate*(#outstanding requests+1)−Slack  [EQ. 3]

An example of such use is where a device completes the processing of one of the buffers at time 1000 ns and switches to the other buffer. The deadlines for the 100 requests to fill this buffer are in the range of 1250 ns to 26000 ns. After processing the data in the first buffer it takes 25 us for the device to process data in the second buffer. The second buffer thus becomes free at time 26000 ns. Once the second buffer is free, the deadlines for the 100 requests to fill the second buffer is in the range of 26250 ns to 51000 ns.

In certain cases some isochronous devices may operate with both low latency and low memory bandwidth. If it is determined that the memory bandwidth for a low bandwidth isochronous device leaves sufficient memory bandwidth for all other devices connected to the shared memory fabric, then the isochronous device may implement a simplified method for specifying its deadline values.

The manner in which such a device can calculate the deadline for its memory request is to simply add a fixed or configurable delay to the memory requests. An example of this operation is for the isochronous device to contain a configuration register that is programmed to reflect the worst case latency requirement the device can tolerate for all memory requests sent from the device. In this case the device may add the value programmed in the configuration register to the current value of the global timer when a request is sent to the fabric. If the value programmed in the configuration register is less than the threshold value programmed in the fabric to determine when a request is considered a high priority request, then all requests sent from the device are considered high priority requests by the fabric.

As one example of a low data rate device, one or more of the IP blocks may be an audio engine that operates at a relatively low data rate. Although operating at a relatively low data rate, this device may still seek to have relatively low latency for its low rate memory requests. To this end, the audio device may be associated with a deadline logic that generates a deadline value according to the global timer value and a fixed latency value, which may be configured within a configuration register. In an embodiment this latency value may be of a relatively low value (e.g., 5 usec) to thus indicate that these memory requests are to be performed with relatively low latency. Of course other examples of low data rate devices are possible.

In some cases, long delays in the full chip wiring of the request interface from the isochronous device to the shared memory fabric may cause repeater FIFOs to be added in order to meet a certain clock frequency, as such embodiments may include request repeater FIFOs between the requesting device and the fabric. However isochronous devices using request deadlines may implement a FIFO which propagates deadline information forward in order to avoid problems caused by head of line blocking of the request repeater FIFO.

Head of line blocking issues may result in scheduling of isochronous requests using deadlines if a typical FIFO design is used as a request repeater. Because in a typical FIFO design only the request information for the request at the head of the FIFO is visible to the shared memory fabric, the fabric may be unaware of a high priority request present at the input or tail entry of the repeater FIFO.

An example of this head of line blocking issue is where a device sends a request to the fabric which has a required latency of 10 usec. If the fabric is unable to grant the request at the admit arbiter, the pending request may be stored in the request repeater FIFO for some amount of time. If while the request is held in the repeater FIFO the device issues a new request with a shorter deadline (e.g., 1 usec), the fabric would be unaware that the new request with a shorter deadline value has been sent from the isochronous device. In this case the head of line blocking of the typical FIFO design may result in the fabric missing the required latency for the second request.

Figure 5:
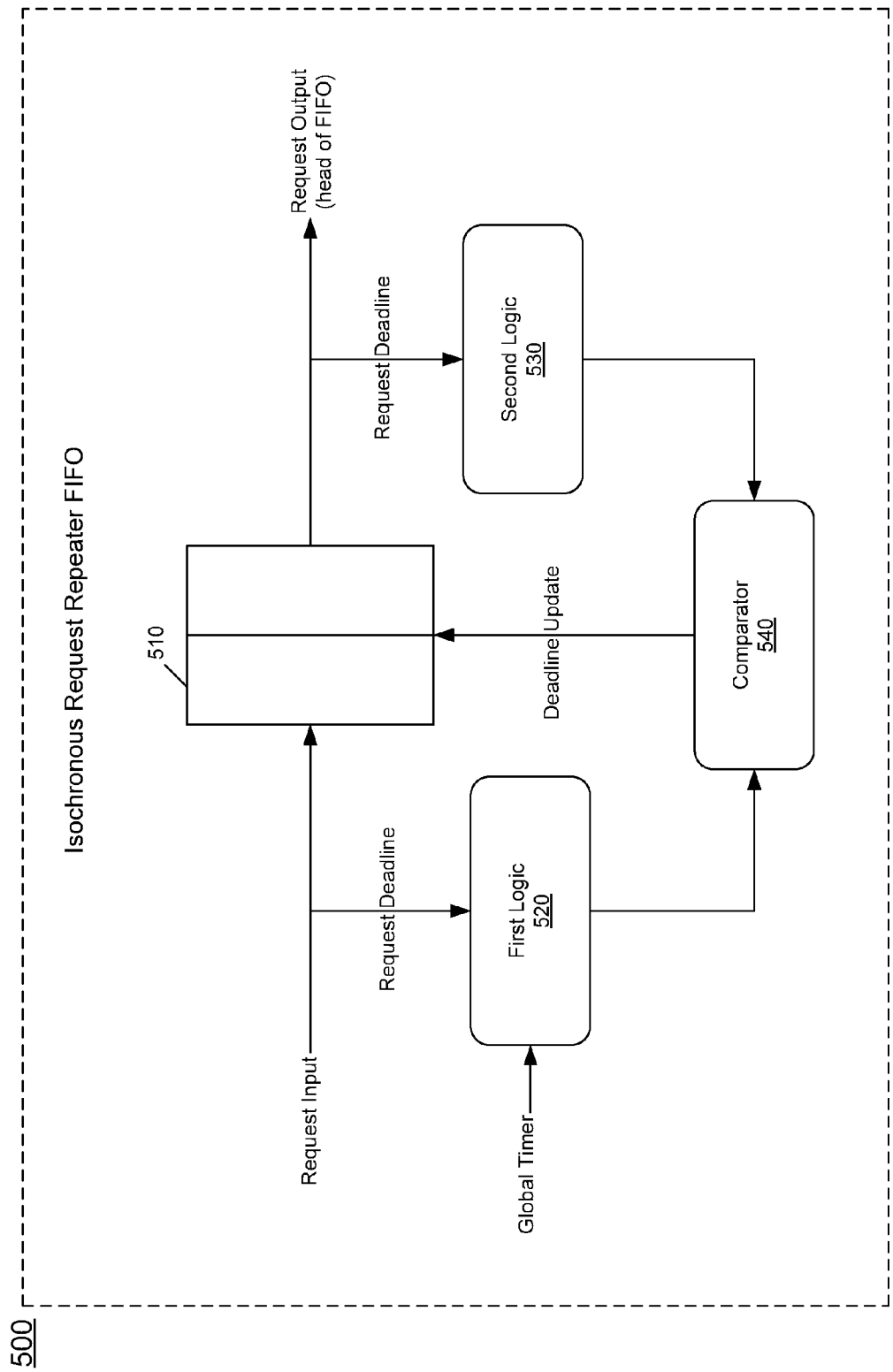
FIG. 5 is a block diagram of a repeater storage in accordance with an embodiment of the present invention.

Referring now to FIG. 5, shown is a block diagram of a repeater storage in accordance with an embodiment of the present invention. As shown in FIG. 5, storage 500 is implemented as a repeater FIFO to store information regarding incoming isochronous requests to the shared memory fabric from an associated device. As seen, storage 500 includes a FIFO 510 that includes a plurality of entries. Each such entry may include information from a given memory request and can include the actual request information and a corresponding deadline for the request. FIFO 510 is configured such that the entry at the head of the buffer is output and new incoming entries are input at the tail of the FIFO. To prevent head of line blocking as described herein, storage 500 includes a first logic 520 and a second logic 530. Each of these logics is configured to receive a request deadline, namely logic 520 receives the incoming request deadline while logic 530 receives the deadline for the request at the head of the FIFO. In addition, each of these logics receives the global timer value to determine a request latency for the corresponding request. These values are compared in a comparison logic 540. When the request latency for the input value to the FIFO is less than the request latency for the request at the head of the FIFO, a deadline update may be effected, e.g., to all entries of FIFO 510 to cause the deadline values to be updated to correspond to the deadline value for the incoming request. Although shown at this high level in the embodiment of FIG. 5, understand the scope of the present invention is not limited in this regard.

Thus in order to resolve the head of line blocking of the typical FIFO design, a FIFO design that propagates deadline information forward to the head entry of the FIFO is used, in various embodiments. The result of the subtraction is the required latency for the request. If the latency for the request at the FIFO input is a negative number or if the latency for the request is less than the latency for the request at the head of the FIFO, then the deadline field for all entries of the repeater FIFO is updated with the deadline value of the request at the input of the FIFO.

The consumer of the request deadline information is the shared memory fabric, which uses the request deadline to determine the required latencies for requests received from isochronous devices. If the latency for a request is less than a programmable threshold value specified using a configuration register in the fabric, the request is considered to be high priority. The majority of the memory traffic in the system is assumed to be low priority isochronous or best effort traffic. Various arbitration points in the shared memory fabric include high priority bypass paths for isochronous requests that are determined to be high priority. These bypass paths allow the high priority isochronous requests to bypass the bulk of the traffic in the fabric and thus allow a lower latency for read data returned from the fabric and write data sent from the device.

Thus using an embodiment of the present invention with the deadline approach, the shared memory fabric may react quicker to changes in request latency requirements. In contrast, using a status channel enables a change to the status indication only after read data is returned to the device. This delay in switching from scheduling requests from the device as high priority limits the memory scheduler's ability to schedule the requests optimally for memory bandwidth.

Still further, an embodiment of the present invention can defer exiting self-refresh longer because the shared memory fabric has information about the state of the memory controller, latency to exit self-refresh, how many other isochronous memory requests are pending and the latency of all isochronous requests stored in the fabric, as examples. As such, the need for a third party programmable engine to be involved with exiting self-refresh for scheduling isochronous memory requests can be avoided.

When the shared memory fabric receives a request from an isochronous device it determines the required latency of the request. In order to determine the latency of a new isochronous memory request, the fabric subtracts the request deadline value from the current value of the global timer. The fabric determines if the result of the subtraction is a positive or negative number by checking the MSB of the result of the subtraction. Because the maximum allowed latency that can be specified by the device is half the range of the global timer, if the MSB of the subtraction is set, the deadline for the request is considered to be a negative number. This information is shown in Table 4, below.

TABLE 4

| | | | | | | | | | | | | |
|---|---|---|---|---|---|---|---|---|---|---|---|---|
| 11 Bit Global Timer | 10 | 9 | 8 | 7 | 6 | 5 | 4 | 3 | 2 | 1 | 0 | Sent From Shared Memory Fabric (Range 0-511.75 usec) |
| 10 Bit Latency Value | | 9 | 8 | 7 | 6 | 5 | 4 | 3 | 2 | 1 | 0 | Known Internally To Device (Range 0-255.75 usec) |
| 11 Bit Request Deadline | 10 | 9 | 8 | 7 | 6 | 5 | 4 | 3 | 2 | 1 | 0 | Sent From Device To Fabric (Range 0-511.75 usec) |
| 11 Bit Difference (Request Deadline- Global Timer) | 10 | 9 | 8 | 7 | 6 | 5 | 4 | 3 | 2 | 1 | 0 | Known Internally to Fabric (Range 0-255.75 usec) |

After calculating the required latency of the request, the fabric then determines whether the request is to be considered a high priority isochronous request to memory. If the MSB of the result of the subtraction is set, indicating a negative deadline, the request is considered to be a high priority request by the fabric. If the MSB of the result of the subtraction is 0, then the deadline value is considered to be a positive number. If the deadline for the request is a positive value, the result of the subtraction is the required latency for the request.

After calculating the latency for the request, the fabric then compares the request latency to the value stored in a configuration register that in an embodiment is programmed by software or basic input output system (BIOS) that specifies a threshold value for when a request is considered a high priority request by the fabric. In addition the fabric also compares the request latency to a second configuration register programmed with the latency required for the memories to exit their low power or self-refresh states.

Figure 6:
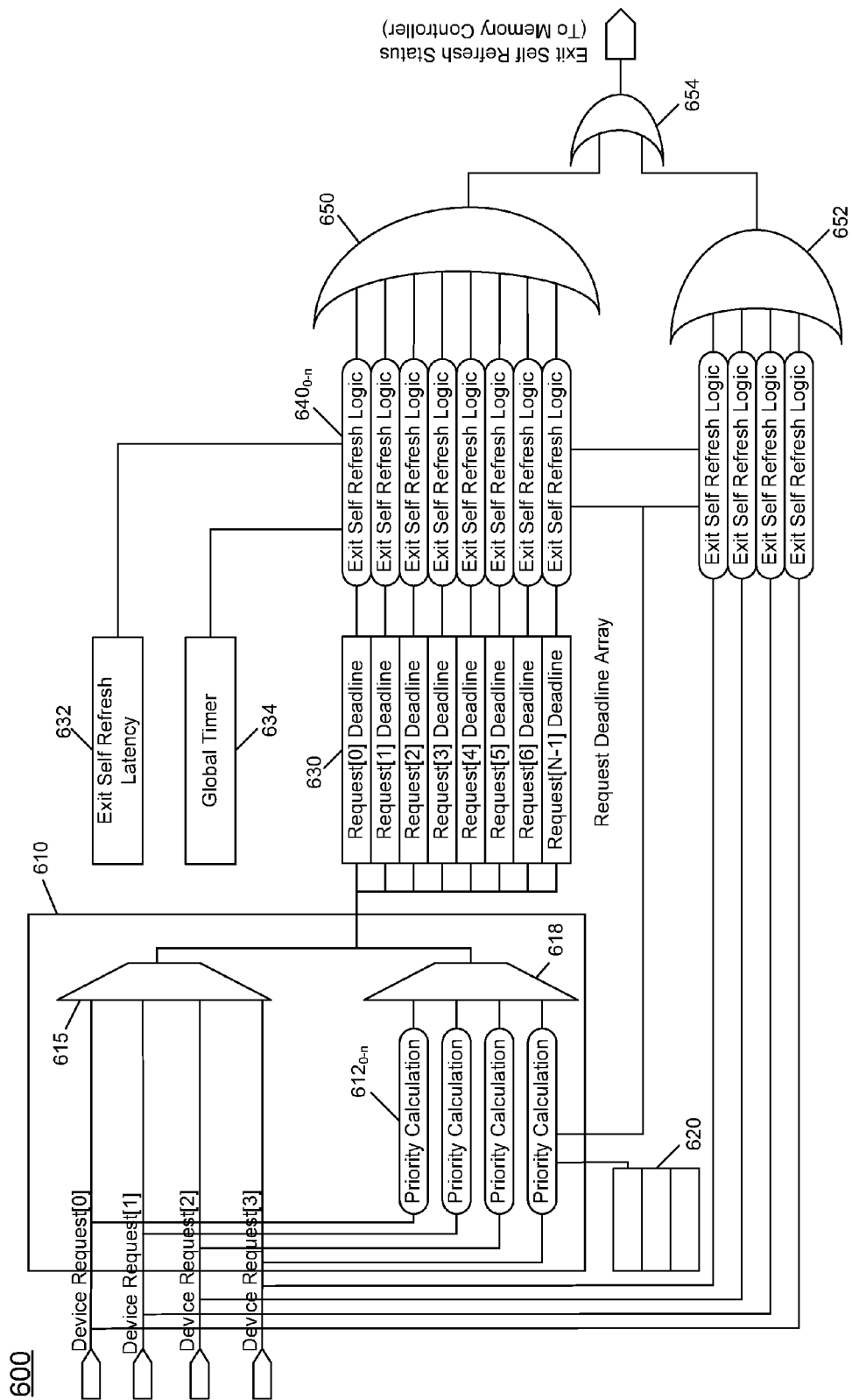
FIG. 6 is a block diagram of arbitration logic in accordance with an embodiment of the present invention.

In an embodiment, the shared memory fabric contains logic on the inputs of the request interface of isochronous devices to determine if any pending memory request would cause the memory controller to exit the low power self-refresh state. Referring now to FIG. 6, shown is a block diagram of arbitration logic in accordance with an embodiment of the present invention. As shown in FIG. 6, logic 600 includes an admit arbiter 610 including a low priority arbiter 616 and a high priority arbiter 618. As seen, low priority arbiter 616 directly receives incoming device requests from the associated devices. Instead prior to high priority arbiter 618, a priority calculation logic $612_0$-$612_n$, determines a priority calculation for the incoming device requests. To this end, each of these logics receives an incoming device request and information from a configuration storage 620, which in an embodiment includes a high priority threshold value and a class of service value. This high priority threshold value may be programmed for the worst case latency for the control logic of the fabric to complete a read request. And the class of service information indicates whether a given device is an isochronous device or a best effort device. In addition, priority calculation logic 612 further receives the global timer value. Based on all of this information, a determination can be made whether a given request is a high priority request. Thus this configuration storage 620 of the shared memory fabric contains a configuration register that is programmed for each requesting device to indicate whether the class of service for the device is isochronous or best effort, and a configuration register for the high priority threshold that is programmed for the worst case latency for the memory scheduler and the memory controller to complete a read request.

In an embodiment, the admit arbiter has two priority levels: a low latency high priority path used for high priority isochronous requests; and a low priority path used for both best effort and low priority isochronous requests. The calculation performed by logic 612 for using the request deadline to determine if the request is high priority is shown below in EQ. 5, according to one embodiment.

High Priority Calculation=Request Deadline
 Value<Global Timer+High Priority threshold [EQ. 5]

Thereafter a final arbitration within admit arbiter 610 occurs to output a selected request. Then a resulting request from arbiter 610 is provided to a request deadline array 630, which in an embodiment acts as a scoreboard and may include a plurality of tracker entries each indicating a deadline associated with a given request. In turn these deadline values may be provided to a set of exit self-refresh logics $640_0$-$640_n$ each of which is also configured to receive the global timer value 634 and an exit self-refresh latency value 632. As further seen, each of the device requests may also directly be provided to a second set of exit self-refresh logics $645_0$-$645_n$. Each of these logics 640 and 645 may perform an exit self-refresh calculation that in turn provide exit self-refresh values are provided to logic circuitries 650 and 652, respectively. In an embodiment, these logic circuitries may be configured as OR gates to thus generate an active self-refresh exit signal when a given one of these self-refresh values indicates that the associated memory is to exit self-refresh to meet a required latency of a request. After a final combining in another logic circuitry 654, which also may be configured as an OR gate, an exit self-refresh status signal may be communicated to the memory controller. In an embodiment, this communication may be via a status channel. Thus if any requests from an isochronous device have a deadline value that is less than the sum of current value of global and the exit self-refresh threshold configuration register, an indication is sent to the memory controller to exit self-refresh. Although shown at this high level in the embodiment of FIG. 6, understand the scope of the present invention is not limited in this regard. In one embodiment, when the status channel is set to 0 the memory controller is allowed to enter self-refresh and when the status channel is non-zero the memory controller may exit self-refresh.

In an embodiment, the fabric also stores the deadline for every request in the request and coherency tracker scoreboard to determine when the memory controller should exit self-refresh. If only low priority isochronous requests are stored in the fabric scoreboards, the fabric may wait as long as possible before sending an indication to the memory controller to exit self-refresh. The delay of exiting the self-refresh state allows the fabric to accumulate as many memory requests as possible before exiting self-refresh to meet the required latency of the isochronous device. In an embodiment, the calculation for determining when to exit self-refresh is as follows in EQ. 6:

Exit Self Refresh Calculation=Request Deadline
 Value<Global Timer+Exit Self Refresh Threshold [EQ. 6]

The admit arbiter selects the winner of the arbitration and sends the request to the fabric's request and coherency tracker and memory scheduler scoreboards. If the request was determined to be high priority at the admit arbiter, it is also considered high priority by the request and coherency tracker and the memory scheduler, in an embodiment. When the request is granted by the admit arbiter, request information is stored in the request and coherency tracker and memory scheduler scoreboards. The two scoreboards contain different information about the request as used for their respective functionality. In an embodiment, the two scoreboards may be different sizes and have a different number of scoreboard entries. The deadline for the request is stored for each entry in the request and coherency tracker. Logic may be associated with each deadline entry to determine if a request is high or low priority. As the global timer increments, low priority isochronous requests may be promoted to high priority requests based on the deadline value for the request. In an embodiment, the logic used for determining whether a request is high or low priority is the same as what is used at the admit arbiter.

For write requests the write data may be transferred to the fabric using the requesting device's data-out sub-channel of the interface. The request and coherency tracker supports two levels of priority for write requests, in an embodiment. The deadline information for each entry is checked to determine if the request is high or low priority. For high priority write requests, the request and coherency tracker provides a high priority bypass path from the requesting device's data-out sub channel to the internal data buffer. Best effort and low priority isochronous write requests may use the low priority path to the fabric's internal data buffer. The request and coherency tracker also has a configuration mode register that can disable the high priority write path, which when enabled causes write requests to transfer data from the device's data-out sub-channel to the fabric's data buffer using the low priority path.

For read requests, the read data returned to the device is transferred from the fabric using the requesting device's data-in sub-channel of the interface. The request and coherency tracker also supports two levels of priority for read requests, in an embodiment. The deadline information for each entry is also used to determine if the read request is high or low priority. Similar to write requests, the request and coherency tracker provides a low latency path from the fabric's internal data buffer to the requesting device's data-in sub channel. Best effort or low priority isochronous read requests may use the low priority path from the fabric's internal data buffer. The request and coherency tracker also has a configuration mode register for the read data path, which when enabled, disables the high priority path, and when enabled all read requests transfer data from the fabric's data buffer to the device's data-in sub-channel using the low priority path.

In an embodiment, the memory scheduler supports three levels of priority for scheduling read requests. The highest priority level is used for scheduling high priority isochronous read requests, the next priority level is used for scheduling best effort read requests, and the lowest level is used for scheduling low priority isochronous read requests. For write requests to memory, after the data is pulled from the device there is no longer a latency requirement for writing the data to memory. Therefore, all write requests sent from the fabric to the memory controller use the same priority level.

When a request is granted by the admit arbiter the class of service for the request is stored in the scoreboard to indicate if the request is for a best effort or isochronous device. In an embodiment, for each memory request stored in the request and coherency tracker there is an associated entry in the memory scheduler scoreboard. Multiple entries in the request and coherency tracker may be associated with the same entry in the memory scheduler scoreboard. The index or tag into the memory scheduler scoreboard is stored for every memory request in the request and coherency tracker, in an embodiment. To communicate to the memory scheduler whether a request is high or low priority, a bit vector having a length equal to the number of entries in the memory scheduler scoreboard may be used. If an entry in the request and coherency tracker is high priority, a bit is set in the bit vector input to the memory scheduler using the tag stored in the request and coherency tracker as the index into the bit vector. When scheduling isochronous memory read requests, the memory scheduler tests the bit in the bit vector for the scoreboard entry to determine if the request is high or low priority.

Figure 7:
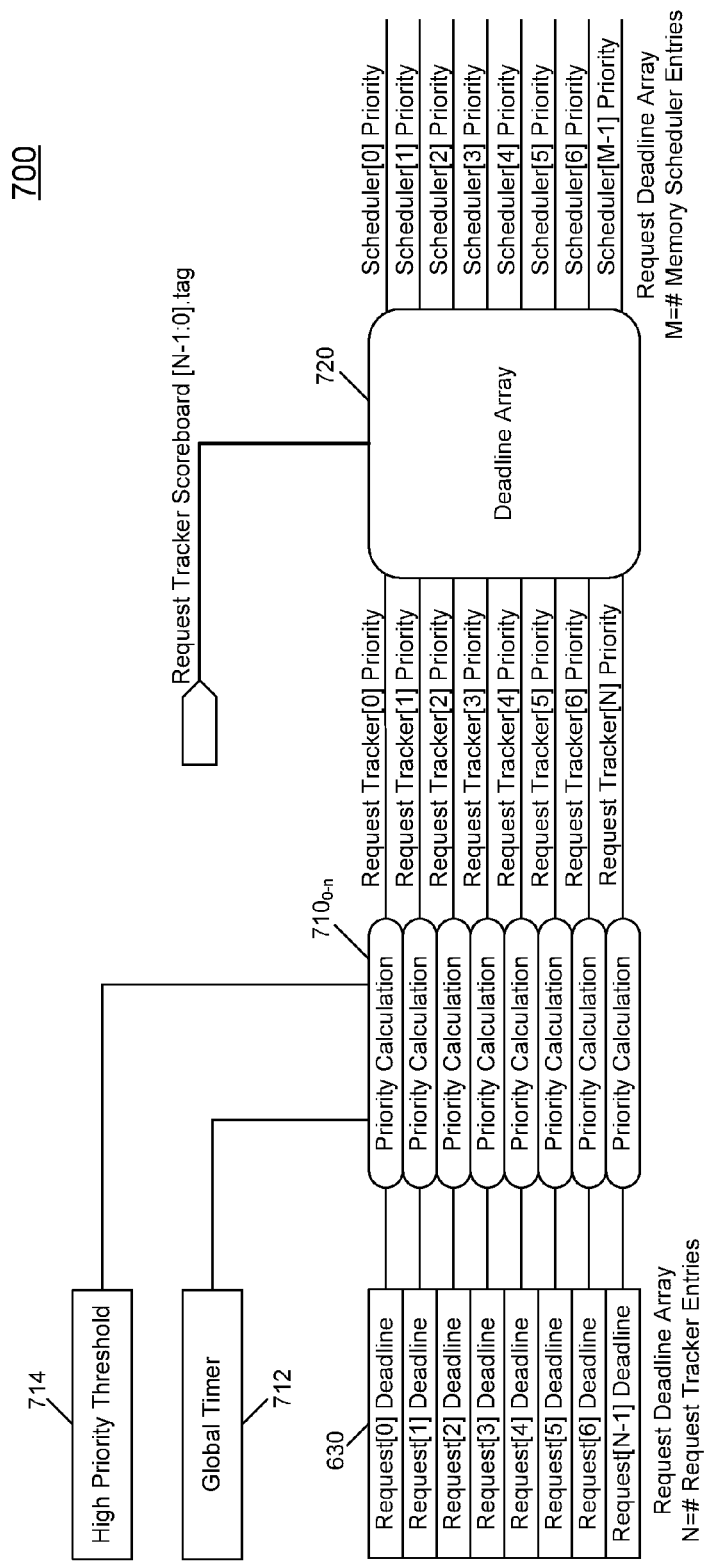
FIG. 7 is a block diagram illustrating logic within a request tracker and memory scheduler in accordance with an embodiment of the present invention.

Referring now to FIG. 7, shown is a block diagram illustrating logic within a request tracker and memory scheduler in accordance with an embodiment of the present invention. As shown in FIG. 7, logic 700 is coupled to receive the same request deadline information from request deadline array 630 of FIG. 6. As seen, this deadline information is provided to a plurality of priority calculation logics $710_0$-$710_n$, each of which is further configured to receive a global timer value 712 and a high priority threshold value 714. Based on this information, a priority value for a corresponding request tracker is generated and is provided to a request deadline array 720, which in an embodiment includes memory scheduler entries to provide a corresponding priority for each corresponding scheduler entry. As further seen, array 720 is further configured to receive a bit vector from a request tracker scoreboard. While as shown at this high level in the embodiment of FIG. 7, understand the scope of the present invention is not limited in this regard.

Figure 8:
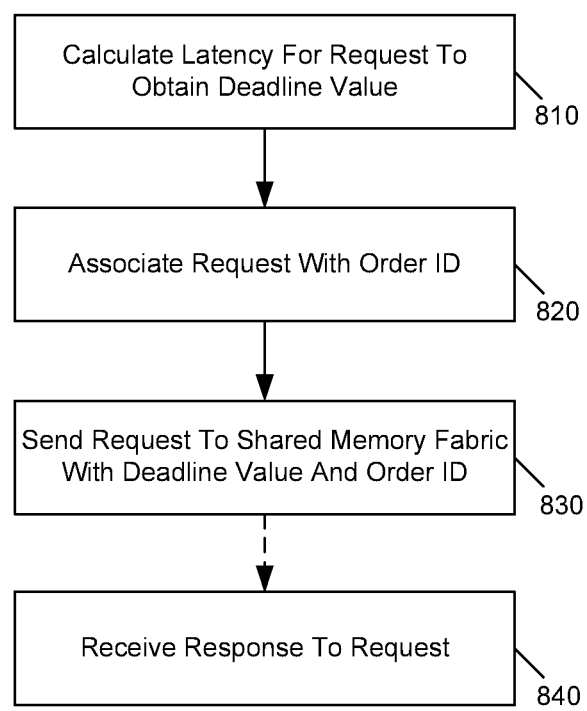
FIG. 8 is a flow diagram of a method for generating requests in accordance with an embodiment of the present invention.

Referring now to FIG. 8, shown is a flow diagram of a method in accordance with an embodiment of the present invention. As shown in FIG. 8, method 800 may be performed by deadline logic included in or associated with a given device of multiple devices within an SoC, such as independent IP blocks. Note that in some embodiments, this deadline logic may be present within the IP block itself. In other implementations, particularly where a given IP block is a licensed block of a third party, instead the deadline logic may be included in interface logic that interfaces this third party IP logic within the SoC, such as a given gasket layer or logic. Of course in still other embodiments the deadline logic can be implemented in other locations of the SoC associated with a given device.

Thus as seen in FIG. 8, method 800 begins when a memory request is to be sent from the device to the shared memory fabric. As discussed above various types of memory requests including reads, writes, snoop requests and so forth may be issued. At block 810, a latency value may be calculated for a request in order to obtain a deadline value. Depending on the type of device and its arrangement such as buffering arrangement as well as other configuration of the device, a deadline value can thus be generated. For example, a latency value can be obtained or calculated and combined with a global timer value to generate the deadline value. Next at block 820 an order ID can be associated with the request. By way of this order ID, a relative priority is thus associated with the request. For example, assume a device that sends different types of memory requests such as a first type of request associated with regular read requests, a second type of request associated with write requests, and a third type of memory request, e.g., due to a cache miss that thus indicates a high priority need for data. As such, different order IDs can be associated with these different types of memory requests. As one such example, a first order ID may be associated with read requests, a second order ID may be associated with write requests, and a third order ID may be associated with read requests associated with cache misses. In this example, the third order ID may indicate the highest priority and the first order ID associated with read requests may indicate a second highest relative priority. Further note that in connection with these relative priorities the fabric can provide responses to the memory requests in or out of order.

Still referring to FIG. 8, next the deadline logic may send the request to the shared memory fabric with the deadline value and the order ID value (block 830). Of course understand that additional information such as request byte length and/or security attributes used for access to protected memory regions may also be included with such memory requests. Finally as seen in FIG. 8, at a later time, e.g., when requested data has been obtained from an associated memory, a response may be received by the device for a given request (block 840). Although shown at this high level in the embodiment of FIG. 8, understand the scope of the present invention is not limited in this regard.

Figure 9:
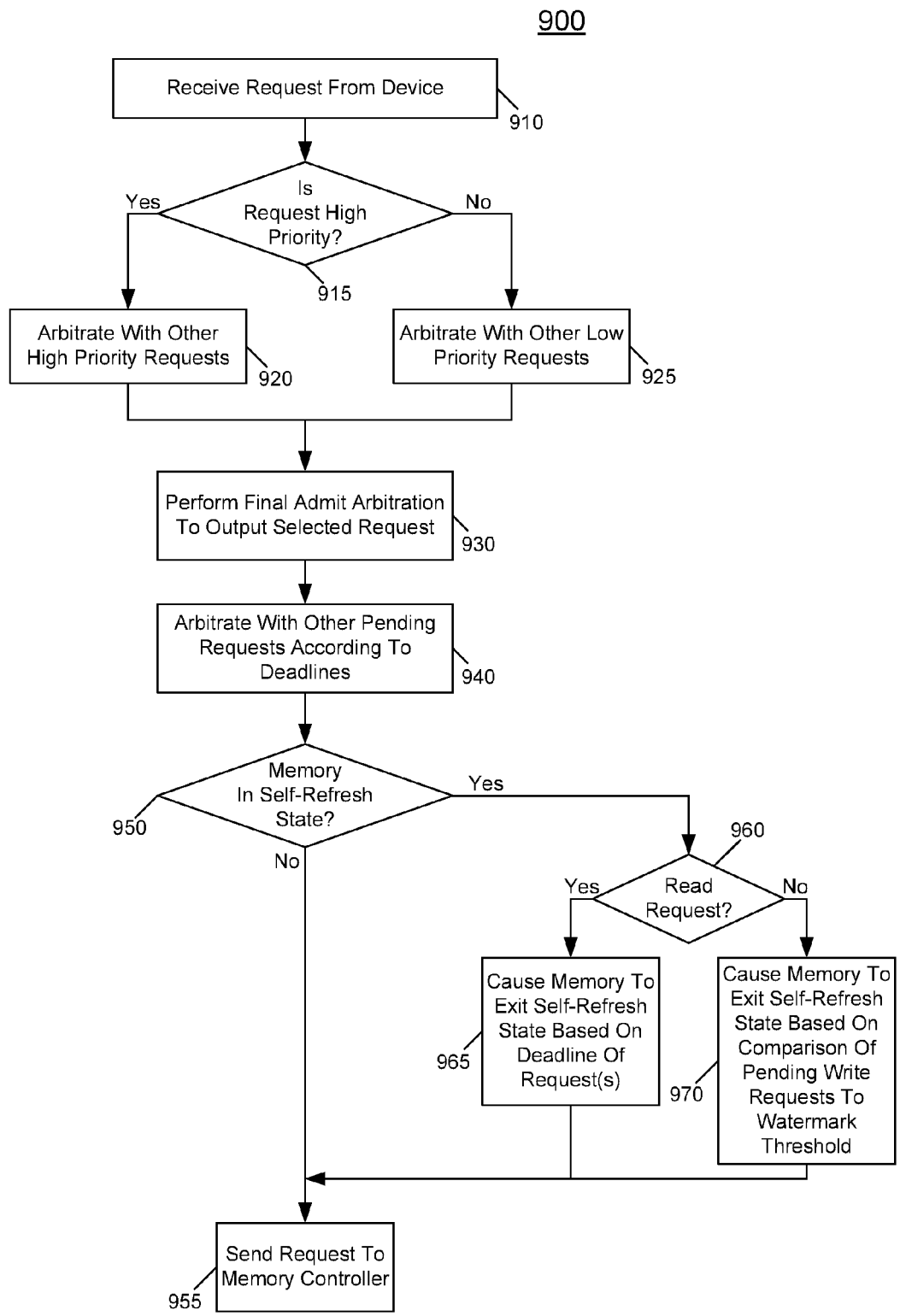
FIG. 9 is a flow diagram of a method for handling incoming requests in accordance with an embodiment of the present invention.

Referring now to FIG. 9, shown is a flow diagram of a method for handling incoming requests in accordance with an embodiment of the present invention. In the embodiment of FIG. 9, method 900 may be performed by various arbitration logic of a shared memory fabric that can receive and handle incoming memory requests from multiple devices, e.g., of an SoC or otherwise coupled to the shared memory fabric. As seen, method 900 begins by receiving a request from a device (block 910). Note that this memory request may or may not include a deadline value based on the type of device. For purposes of a memory request that does not include a deadline value, it can be assumed to be a low priority request. Thus at diamond 915 for such memory request received from best effort devices, the determination is in the negative and control passes to block 925.

Instead for requests received with a deadline value from an isochronous device at diamond 915 it can be determined whether the request is of a high priority based on the deadline value and configuration information such as a threshold value that indicates whether a request is to be considered a high priority request. Based on this analysis control then passes to either of blocks 920 and 925.

In an embodiment, arbitration logic such as an admit arbiter may include a low priority path and a high priority path, both of which operate to arbitrate a given request with other requests of a similar type (e.g., high and low priority requests). Accordingly at both blocks 920 and 925 an arbitration is performed to thus output a selected memory request. Then at block 930 a final admit arbitration may be performed to output a selected request of these multiple requests from the various request paths of the admit arbiter.

This selected request may then be sent to additional arbitration logic such as a memory scheduler arbiter, where the request may be arbitrated with other pending requests according to deadlines associated with different requests (block 940). Control next passes to diamond 950 where it can be determined whether an associated memory is in a self-refresh state. If not, control passes directly to block 955 where the selected request can be sent to the memory controller and thereafter passed to the memory itself.

If instead it is determined that the memory is in a self-refresh state, control passes to diamond 960. There it can be determined whether the given request is a read request. If so, control passes to block 965 where based on a deadline value associated with the request, the memory may be caused to exit the self-refresh state (block 965). For example, a comparison of the deadline value to a latency value for causing the memory to exit the self-refresh state may be performed to determine the appropriate time at which to take the memory out of self-refresh state. Note in some embodiments, the memory may be caused to exit the self-refresh state when a request does not have a deadline associated with it. From block 965, control passes to block 955, discussed above. Otherwise if the request is not a read request (e.g., it is a write request), control passes to block 970 where the memory may be caused to exit the self-refresh state based on comparison of the number of pending write requests to a watermark threshold. That is, to aid in power conservation, a number of write requests may be grouped together and when a threshold number of such write requests are available, the memory may be caused to exit the self-refresh state to perform these memory requests. Although shown at this high level in the embodiment of FIG. 9, understand the scope of the present invention is not limited in this regard.

Embodiments may be used in many different SoCs or other semiconductor devices that integrate various IPs onto a single die to connect these IPs to memory via a memory fabric. Still further a memory fabric in accordance with an embodiment of the present invention may be used to provide a QoS level for meeting isochronous requirements of at least some of these IPs.

Figure 10:
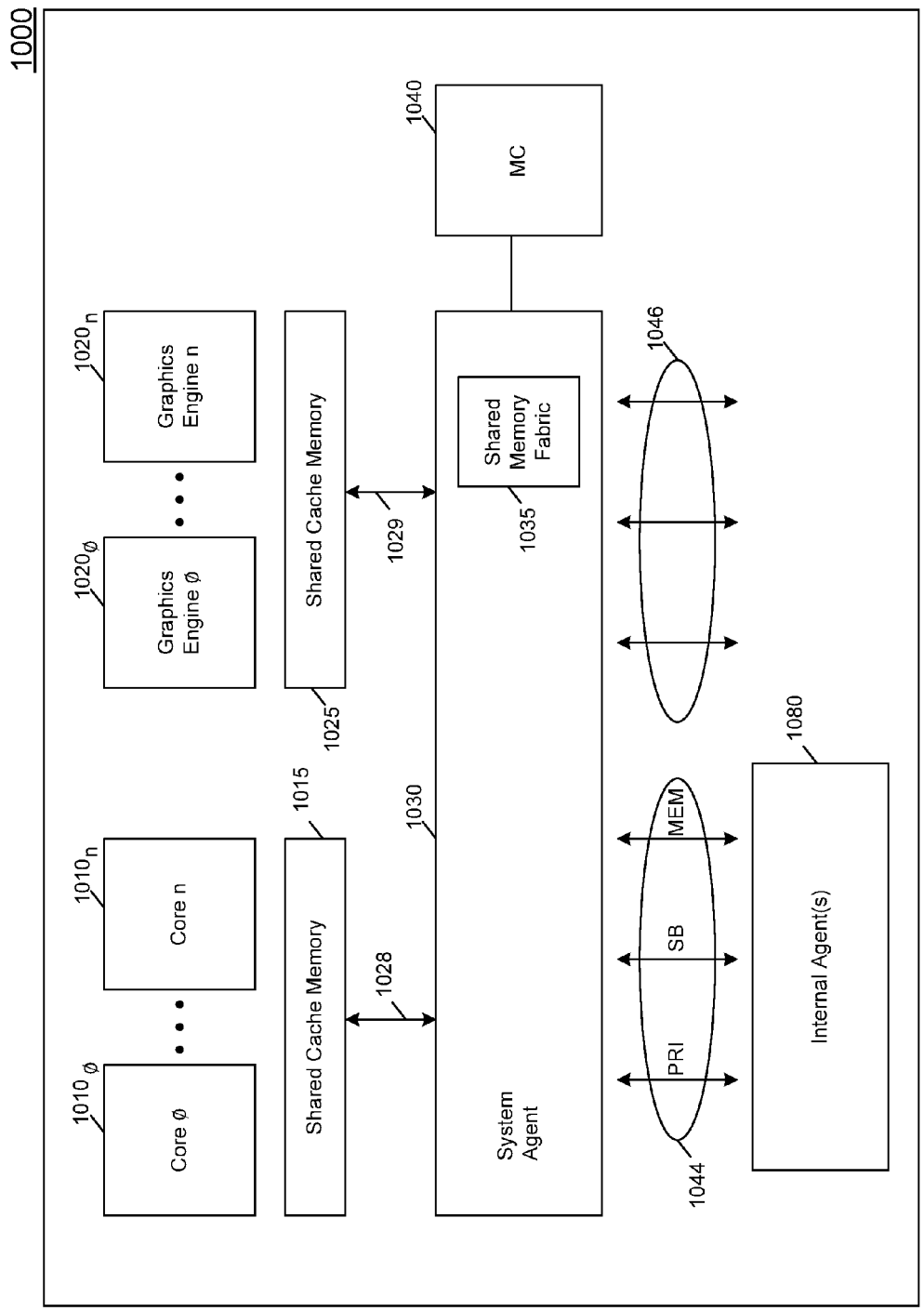
FIG. 10 is a block diagram of an SoC in accordance with an embodiment of the present invention.

Referring now to FIG. 10, shown is a block diagram of an SoC in accordance with an embodiment of the present invention. As shown in FIG. 10, SoC 1000 is a single die semiconductor device including multiple IP blocks along with a shared memory arbiter as described above. In the embodiment of FIG. 10 a plurality of cores $1010_0$-$1010_n$ are provided, each of which can independently execute instructions. In one embodiment, all of these cores are of a single design such as an in-order core design, e.g., of an Intel Architecture™ such as an Atom™-based core. In other embodiments, the cores may be out-of-order processors such as an Intel Architecture™ (IA) 32 core such as an Intel Core™-based design. In other embodiments, a mix of heterogeneous cores may be provided. In addition, a plurality of graphics engines, namely independent graphics units $1020_0$-$1020_n$ may be provided each to independently perform graphics operations. As seen, the multiple cores are coupled to a shared cache memory 1015 such as a level 2 (L2) cache and similarly, the graphics engines are coupled to another shared cache memory 1025.

A system agent 1030 is coupled to these cores and graphics engines via corresponding in-die interconnects 1028 and 1029. As seen, system agent 1030 includes a shared memory fabric 1035 which may be configured as described herein. Of course various other logic, controllers and other units such as a power management unit may be present within system agent 1030. As seen, shared memory fabric 1035 communicates with a memory controller 1040 that in turn couples to an off-chip memory such as a system memory configured as DRAM. In addition, system agent 1030 is coupled via a set of interconnects 1044 to one or more internal agents 1050 such as various peripheral devices. In an embodiment, interconnect 1044 may include a priority channel interconnect, a sideband channel interconnect, and a memory channel interconnect. A similarly configured interconnect 1046 provides for communication between system agent 1030 and one or more off-chip agents (not shown for ease of illustration in the embodiment of FIG. 10). Although shown at this high level in FIG. 10, understand the scope of the present invention is not limited in this regard.

Figure 11:
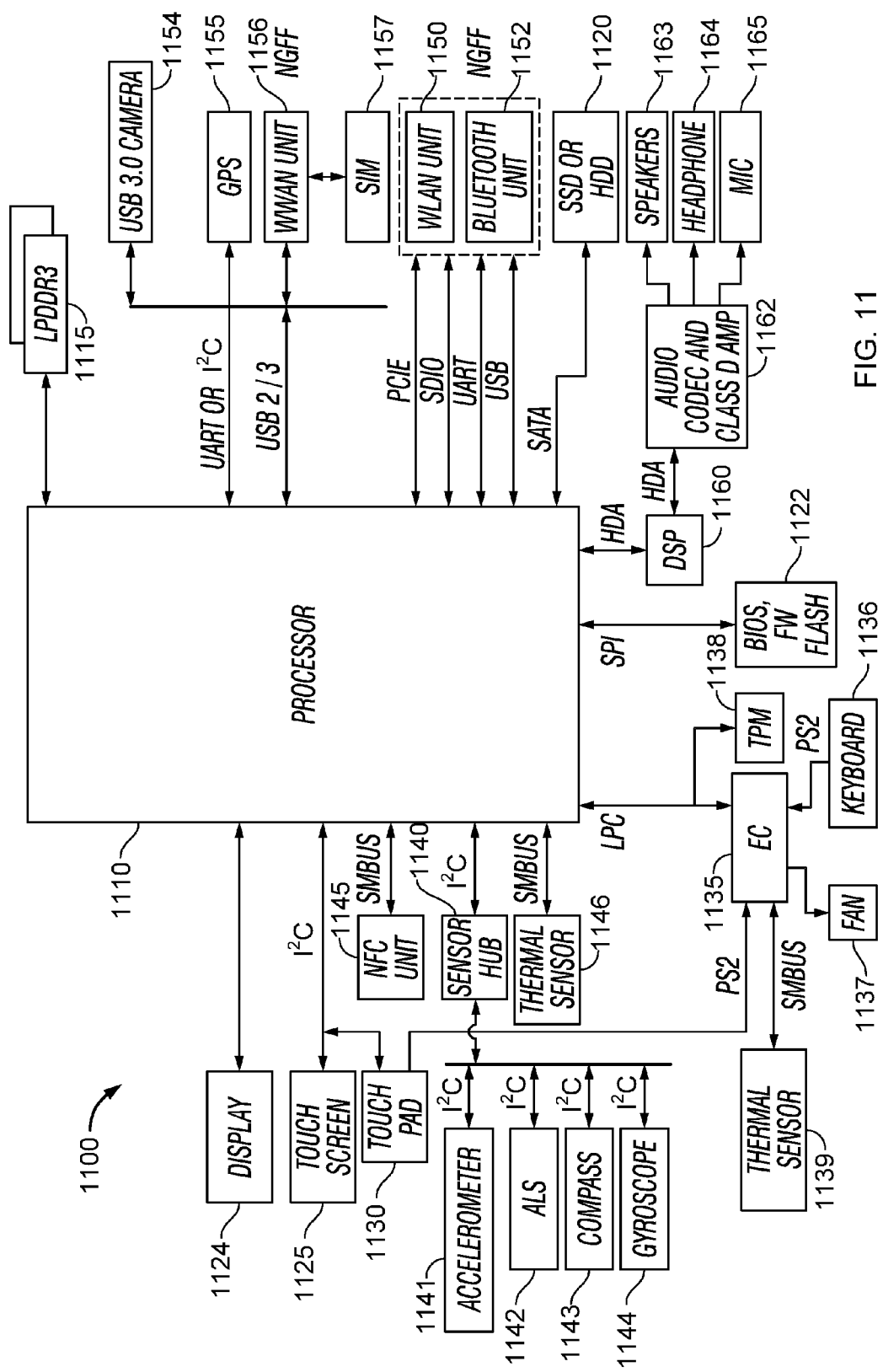
FIG. 11 is a block diagram of components present in a computer system in accordance with an embodiment of the present invention.

Referring now to FIG. 11, shown is a block diagram of components present in a computer system in accordance with an embodiment of the present invention. As shown in FIG. 11, system 1100 can include many different components. In one embodiment, system 1100 is a user equipment, touch-enabled device that incorporates an SoC as described herein. Note that the components of system 1100 can be implemented as ICs, portions thereof, discrete electronic devices, or other modules adapted to a circuit board such as a motherboard or add-in card of the computer system, or as components otherwise incorporated within a chassis of the computer system. Note also that the block diagram of FIG. 11 is intended to show a high level view of many components of the computer system. However, it is to be understood that additional components may be present in certain implementations and furthermore, different arrangement of the components shown may occur in other implementations.

As seen in FIG. 11, a processor 1110, which may be a low power multicore processor socket such as an ultra low voltage processor, may act as a main processing unit and central hub for communication with the various components of the system. Such processor can be implemented as a SoC as described herein. In one embodiment, processor 1110 may be an Intel® Architecture Core™-based processor such as an i3, i5, i7 or another such processor available from Intel Corporation, Santa Clara, Calif., such as a processor that combines one or more Core™-based cores and one or more Intel® ATOM™-based cores to thus realize high power and low power cores in a single SoC. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments such as an Apple A5 or A6 processor.

Processor 1110 may communicate with a system memory 1115, which in an embodiment can be implemented via multiple memory devices to provide for a given amount of system memory. To provide for persistent storage of information such as data, applications, one or more operating systems and so forth, a mass storage 1120 may also couple to processor 1110. Also shown in FIG. 11, a flash device 1122 may be coupled to processor 1110, e.g., via a serial peripheral interface (SPI). This flash device may provide for non-volatile storage of system software, including a basic input/output software (BIOS) as well as other firmware of the system.

Various input/output (IO) devices may be present within system 1100. Specifically shown in the embodiment of FIG. 11 is a display 1124 which may be a high definition LCD or LED panel configured within a lid portion of the chassis. This display panel may also provide for a touch screen 1125, e.g., adapted externally over the display panel such that via a user's interaction with this touch screen, user inputs can be provided to the system to enable desired operations, e.g., with regard to the display of information, accessing of information and so forth. In one embodiment, display 1124 may be coupled to processor 1110 via a display interconnect that can be implemented as a high performance graphics interconnect. Touch screen 1125 may be coupled to processor 1110 via another interconnect, which in an embodiment can be an $I^2C$ interconnect. As further shown in FIG. 11, in addition to touch screen 1125, user input by way of touch can also occur via a touch pad 1130 which may be configured within the chassis and may also be coupled to the same $I^2C$ interconnect as touch screen 1125.

For perceptual computing and other purposes, various sensors may be present within the system and can be coupled to processor 1110 in different manners. Certain inertial and environmental sensors may couple to processor 1110 through a sensor hub 1140, e.g., via an $I^2C$ interconnect. In the embodiment shown in FIG. 11, these sensors may include an accelerometer 1141, an ambient light sensor (ALS) 1142, a compass 1143 and a gyroscope 1144. Other environmental sensors may include one or more thermal sensors 1146 which may couple to processor 1110 via a system management bus (SMBus) bus, in one embodiment.

Also seen in FIG. 11, various peripheral devices may couple to processor 1110 via a low pin count (LPC) interconnect. In the embodiment shown, various components can be coupled through an embedded controller 1135. Such components can include a keyboard 1136 (e.g., coupled via a PS2 interface), a fan 1137, and a thermal sensor 1139. In some embodiments, touch pad 1130 may also couple to EC 1135 via a PS2 interface. In addition, a security processor such as a trusted platform module (TPM) 1138 in accordance with the Trusted Computing Group (TCG) TPM Specification Version 1.2, dated Oct. 2, 2003, may also couple to processor 1110 via this LPC interconnect.

System 1100 can communicate with external devices in a variety of manners, including wirelessly. In the embodiment shown in FIG. 11, various wireless modules, each of which can correspond to a radio configured for a particular wireless communication protocol, are present. One manner for wireless communication in a short range such as a near field may be via a near field communication (NFC) unit 1145 which may communicate, in one embodiment with processor 1110 via an SMBus. Note that via this NFC unit 1145, devices in close proximity to each other can communicate. For example, a user can enable system 1100 to communicate with another (e.g.,) portable device such as a smartphone of the user via adapting the two devices together in close relation and enabling transfer of information such as identification information payment information, data such as image data or so forth. Wireless power transfer may also be performed using a NFC system.

As further seen in FIG. 11, additional wireless units can include other short range wireless engines including a WLAN unit 1150 and a Bluetooth unit 1152. Using WLAN unit 1150, Wi-Fi™ communications in accordance with a given Institute of Electrical and Electronics Engineers (IEEE) 802.11 standard can be realized, while via Bluetooth unit 1152, short range communications via a Bluetooth protocol can occur. These units may communicate with processor 1110 via, e.g., a USB link or a universal asynchronous receiver transmitter (UART) link. Or these units may couple to processor 1110 via an interconnect via a Peripheral Component Interconnect Express™ (PCIe™) protocol in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the next generation form factor (NGFF) connectors adapted to a motherboard.

In addition, wireless wide area communications, e.g., according to a cellular or other wireless wide area protocol, can occur via a WWAN unit 1156 which in turn may couple to a subscriber identity module (SIM) 1157. In addition, to enable receipt and use of location information, a GPS module 1155 may also be present. Note that in the embodiment shown in FIG. 11, WWAN unit 1156 and an integrated capture device such as a camera module 1154 may communicate via a given USB protocol such as a USB 2.0 or 3.0 link, or a UART or $I^2C$ protocol. Again the actual physical connection of these units can be via adaptation of a NGFF add-in card to an NGFF connector configured on the motherboard.

To provide for audio inputs and outputs, an audio processor can be implemented via a digital signal processor (DSP) 1160, which may couple to processor 1110 via a high definition audio (HDA) link. Similarly, DSP 1160 may communicate with an integrated coder/decoder (CODEC) and amplifier 1162 that in turn may couple to output speakers 1163 which may be implemented within the chassis. Similarly, amplifier and CODEC 1162 can be coupled to receive audio inputs from a microphone 1165 which in an embodiment can be implemented via dual array microphones to provide for high quality audio inputs to enable voice-activated control of various operations within the system. Note also that audio outputs can be provided from amplifier/CODEC 1162 to a headphone jack 1164. Although shown with these particular components in the embodiment of FIG. 11, understand the scope of the present invention is not limited in this regard.

The following examples pertain to further embodiments.

In one example, an apparatus comprises a plurality of intellectual property (IP) blocks of a semiconductor device coupled to a fabric, wherein at least some of the plurality of IP blocks are associated with a deadline logic to generate a deadline value to indicate a latency to complete a memory request and to communicate the memory request to the fabric with the deadline value.

In an example, the fabric comprises an admit arbiter to receive a plurality of memory requests from the plurality of IP blocks and to select one of the plurality of memory requests to provide to a memory scheduler arbiter, and the memory scheduler arbiter coupled to the admit arbiter to select a first memory request from a group of memory requests to provide to a memory controller coupled to the fabric.

In an example, the fabric is to arbitrate between the plurality of memory requests based at least in part on the deadline value of the first memory request.

In an example, the at least some of the plurality of IP blocks comprise latency sensitive devices.

In an example, an interface logic is coupled to a first IP block, the interface logic including the deadline logic associated with the first IP block.

In an example, the deadline logic is to associate a first order identifier with a first memory request to indicate a first priority of the first memory request, and to communicate the first order identifier with the first memory request.

In an example, the deadline logic is to associate a second order identifier with a second memory request to indicate a second priority of the second memory request, wherein the second priority is greater than the first priority and the fabric is to handle the second memory request out of order and ahead of the first memory request based on the second order identifier.

In an example, the deadline logic is to generate the deadline value based on a latency requirement for the first memory request of the first IP block and a global timer value received from the fabric.

In an example, the deadline value comprises a future absolute time.

In an example, the deadline logic is to calculate a first deadline value for a read request based at least in part on a global timer value received from the fabric, a number of entries in a first data buffer of a first device of the plurality of IP blocks, and an access rate of the first data buffer.

In an example, the deadline logic is to calculate a first deadline value for a read request based at least in part on a global timer value received from the fabric for a first memory request associated with a first buffer entry, a number of entries in a first buffer of a first device of the plurality of IP blocks, and an access rate of the first buffer.

In an example, the deadline logic includes a configuration register to store a latency value, and wherein the deadline logic is to generate the deadline value based on a global timer value received from the fabric and the latency value.

Note that the above example apparatus can be implemented using various means.

In another example, a method comprises generating a memory request in a device of a plurality of devices coupled to a shared memory fabric of a system on chip (SoC), calculating a deadline value for the memory request based at least in part on a global timer value received from the shared memory fabric, associating an order identifier with the memory request, and sending the memory request to the shared memory fabric with the deadline value and the order identifier.

In an example, the shared memory fabric forwards the memory request to a first arbiter of the shared memory fabric based on the deadline value and a latency threshold, performs an arbitration in the first arbiter between a first plurality of memory requests including the memory request based at least in part on the deadline values of the plurality of memory requests and forwards a winner memory request of the first plurality of memory requests to a final arbiter of the shared memory fabric.

In an example, a method includes determining if a memory is coupled to the shared memory fabric in a self-refresh state, and if so determining whether to cause the memory to exit the self-refresh state based at least in part on the deadline value of the winner memory request.

In an example, a method includes determining if a memory is coupled to the shared memory fabric in a self-refresh state, and if so determining whether to cause the memory to exit the self-refresh state based at least in part on comparison of a number of pending requests to a first threshold.

In an example, at least one machine readable medium comprises a plurality of instructions that in response to being executed on a computing device, cause the computing device to carry out a method of one or more of the above examples.

In an example, an apparatus comprises means for performing the method as described above.

In another example, a system on chip comprises a plurality of cores each to independently execute instructions, a plurality of graphics engines each to independently execute graphics operations, a first content rendering device corresponding to a first latency sensitive device, a second content rendering device corresponding to a second latency sensitive device, a fabric coupled to the plurality of cores, the plurality of graphics engines, the first and second content rendering devices and a memory controller, and a first interface logic coupled between the first content rendering device and the fabric, the first interface logic including a deadline logic to generate a deadline value associated with a first memory request to indicate a latency requested by the first content rendering device prior to completion of the first memory request.

In an example, the fabric is to receive memory requests from the plurality of cores, the plurality of graphics engines and the first and second content rendering devices, and to arbitrate between the memory requests based at least in part on the deadline value of the memory requests from the first and second content rendering devices.

In an example, the first interface logic is coupled between the first content rendering device and the fabric.

In an example, a repeater buffer is coupled between the first interface logic and the fabric, and a control logic to cause a first deadline value stored in a first entry of the repeater buffer to be updated to a second deadline value responsive to an incoming request from the first content rendering device having a second deadline value.

In another example, an apparatus comprises a fabric coupled between a plurality of intellectual property (IP) blocks of a semiconductor device and a memory controller, the fabric to receive a plurality of memory requests from the plurality of IP blocks, wherein a memory request of the plurality of memory requests is to be associated with a deadline value to indicate a maximum latency before completion of the memory request and an order identifier to indicate a priority of the memory request, and wherein the fabric is to arbitrate between the plurality of memory requests based at least in part on the deadline value of the memory request.

In an example, the fabric comprises an admit arbiter to receive the plurality of memory requests and to select one of the plurality of memory requests to provide to a memory scheduler arbiter, and the memory scheduler arbiter coupled to the admit arbiter to select a first memory request from a group of memory requests to provide to the memory controller.

In an example, the admit arbiter includes a first arbiter to receive memory requests from a first subset of the plurality of IP blocks and a first portion of the plurality of memory requests from a second subset of the plurality of IP blocks, and a second arbiter to receive a second portion of the plurality of memory requests from the second subset of the plurality of IP blocks.

In an example, the second subset of the plurality of IP blocks comprise latency sensitive devices.

In an example, the second arbiter is further to receive a deadline value with each of the second portion of the plurality of memory requests received from the second subset of the plurality of IP blocks.

In an example, the admit arbiter is controllable to operate in a first mode in which memory requests from the second arbiter are selected over memory requests from the first arbiter, and a second mode in which M memory requests from the first arbiter are selected after N memory requests from the second arbiter are selected, wherein M and N are obtained from a configuration register.

In an example, the fabric is to receive a second memory request with a second order identifier, wherein when the second priority is greater than the priority, the fabric is to handle the second memory request out of order and ahead of the of the memory request.

In an example, the fabric is to handle the second memory request out of order based on the second order identifier.

In an example, the fabric is to reorder a first memory request having a first order identifier from a first IP block ahead of a second memory request having a second order identifier from the first IP block, based on the first and second order identifiers.

In an example, the apparatus comprises a system on a chip (SoC) incorporated in a user equipment touch-enabled device.

In another example, an apparatus comprises a plurality of intellectual property (IP) blocks of a semiconductor device coupled to a fabric means, wherein at least some of the plurality of IP blocks are associated with a deadline means for generating a deadline value to indicate a latency to complete a memory request and communicating the memory request to the fabric means with the deadline value.

In an example, the fabric means comprises an admit arbiter to receive a plurality of memory requests from the plurality of IP blocks and to select one of the plurality of memory requests to provide to a memory scheduler arbiter, and the memory scheduler arbiter coupled to the admit arbiter to select a first memory request from a group of memory requests to provide to a memory controller coupled to the fabric.

In an example, an interface means is coupled to a first IP block, the interface means including the deadline means associated with the first IP block.

In an example, the deadline means is to associate a first order identifier with a first memory request to indicate a first priority of the first memory request, and to communicate the first order identifier with the first memory request.

In an example, the deadline means is to associate a second order identifier with a second memory request to indicate a second priority of the second memory request, wherein the second priority is greater than the first priority and the fabric means is to handle the second memory request out of order and ahead of the first memory request based on the second order identifier.

In an example, the deadline means is to generate the deadline value based on a latency requirement for the first memory request of the first IP block and a global timer value received from the fabric means.

In an example, the deadline means is to calculate a first deadline value for a read request based at least in part on a global timer value received from the fabric means, a number of entries in a first data buffer of a first device of the plurality of IP blocks, and an access rate of the first data buffer.

In an example, the at least one of the plurality of IP blocks is selected from a group consisting of an audio player, a video player, and a capture device.

In an example, an apparatus comprises a plurality of cores each to independently execute instructions, a plurality of graphics engines each to independently execute graphics operations, a first content rendering device corresponding to a first latency sensitive device, and a second content rendering device corresponding to a second latency sensitive device, wherein the fabric means is coupled to the plurality of cores, the plurality of graphics engines, the first and second content rendering devices, and a memory controller.

In another example, an apparatus for performing memory requests comprises a plurality of intellectual property (IP) blocks of a semiconductor device coupled to a fabric means, wherein at least some of the plurality of IP blocks are associated with a deadline means for generating a deadline value to indicate a latency to complete a memory request and communicating the memory request to the fabric means with the deadline value.

In an example, the fabric means comprises an admit arbiter to receive a plurality of memory requests from the plurality of IP blocks and to select one of the plurality of memory requests to provide to a memory scheduler arbiter, and the memory scheduler arbiter coupled to the admit arbiter to select a first memory request from a group of memory requests to provide to a memory controller coupled to the fabric.

In an example, the fabric means is to arbitrate between the plurality of memory requests based at least in part on the deadline value of the first memory request.

In an example, an interface means is coupled to a first IP block, the interface means including the deadline means associated with the first IP block.

In an example, the deadline means is to associate a first order identifier with a first memory request to indicate a first priority of the first memory request, and to communicate the first order identifier with the first memory request.

In an example, the deadline means is to associate a second order identifier with a second memory request to indicate a second priority of the second memory request, wherein the second priority is greater than the first priority and the fabric means is to handle the second memory request out of order and ahead of the first memory request based on the second order identifier.

In an example, the deadline means is to generate the deadline value based on a latency requirement for the first memory request of the first IP block and a global timer value received from the fabric means.

In an example, the deadline means is to calculate a first deadline value for a read request based at least in part on a global timer value received from the fabric means, a number of entries in a first data buffer of a first device of the plurality of IP blocks, and an access rate of the first data buffer.

In an example, the deadline means is to calculate a first deadline value for a read request based at least in part on a global timer value received from the fabric means for a first memory request associated with a first buffer entry, a number of entries in a first buffer of a first device of the plurality of IP blocks, and an access rate of the first buffer.

In an example, the deadline means includes a configuration register to store a latency value, and wherein the deadline means is to generate the deadline value based on a global timer value received from the fabric means and the latency value.

In another example, an apparatus for performing memory requests comprises a requesting agent to be coupled to a fabric, the requesting agent including a first means for generating a request including a deadline value to be based on a global timer value received from the fabric and a latency value for the fabric to complete the request, the request further including an order identifier.

In an example, the order identifier is to indicate whether the fabric can return a response to the request out of order with regard to at least one other request communicated to the fabric by the requesting agent.

In an example, a repeater buffer is coupled between the requesting agent and the fabric and having a plurality of entries each to store a request and a deadline value, and a control means coupled to the repeater buffer for causing a first deadline value stored in a first entry of the repeater buffer to be updated to a second deadline value responsive to an incoming request from the requesting agent having the second deadline value.

In an example, the requesting agent includes a first buffer having a plurality of entries each to store data, and wherein the first means is to generate the deadline value based at least in part on an access rate of the first buffer and an available number of the plurality of entries.

In an example, the requesting agent is selected from a group consisting of an audio player, a video player, and a capture device.

In an example, the global timer value comprises a N-bit value and the latency value comprises a M-bit value, wherein M is less than N.

In an example, the first means is to combine the global timer value and the latency value to generate the deadline value.

In an example, the fabric is to provide the request to a first arbiter based on the deadline value.

In an example, the fabric is to determine a fabric latency value based on the deadline value and a current global timer value, and to further classify the request as having a first priority level if the fabric latency value is greater than a first threshold value.

In an example, the fabric is to cause a memory coupled to the fabric to exit a self-refresh state if the fabric latency value is greater than a second threshold value.

In another example, an apparatus comprises a requesting agent to be coupled to a fabric, the requesting agent including a first logic to generate a request including a deadline value to be based on a global timer received from the fabric and a latency value for the fabric to complete the request, the request further including an order identifier.

In an example, the order identifier is to indicate whether the fabric can return a response to the request out of order with regard to at least one other request communicated to the fabric by the requesting agent.

In an example, a repeater buffer is coupled between the requesting agent and the fabric and having a plurality of entries each to store a request and a deadline value, and a control logic is coupled to the repeater buffer to cause a first deadline value stored in a first entry of the repeater buffer to be updated to a second deadline value responsive to an incoming request from the requesting agent having a second deadline value.

In an example, the requesting agent includes a first buffer having a plurality of entries each to store data, and wherein the first logic is to generate the deadline value based at least in part on an access rate of the first buffer and an available number of the plurality of entries.

In an example, the requesting agent is selected from a group consisting of an audio player, a video player, and a capture device.

In an example, the global timer value comprises a N-bit value and the latency value comprises a M-bit value, wherein M is less than N.

In an example, the first logic is to combine the global timer value and the latency value to generate the deadline value.

In an example, the fabric is to provide the request to a first arbiter based on the deadline value.

In an example, the fabric is to determine a fabric latency value based on the deadline value and a current global timer value, and to further classify the request as having a first priority level if the fabric latency value is greater than a first threshold value.

In an example, the fabric is to cause a memory coupled to the fabric to exit a self-refresh state if the fabric latency value is greater than a second threshold value.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a plurality of intellectual property (IP) blocks of a semiconductor device coupled to a fabric, wherein at least some of the plurality of IP blocks include a deadline logic to generate a deadline value based at least in part on a global clock value from the fabric to indicate a maximum latency before completion of a memory request and to communicate the memory request to the fabric, the memory request including the deadline value.

2. The apparatus of claim 1, wherein the fabric comprises:
an admit arbiter to receive a plurality of memory requests from the plurality of IP blocks and to select one of the plurality of memory requests to provide to a memory scheduler arbiter; and the memory scheduler arbiter coupled to the admit arbiter to select a first memory request from a group of memory requests to provide to a memory controller coupled to the fabric.

3. The apparatus of claim 2, wherein the fabric is to arbitrate between the plurality of memory requests based at least in part on the deadline value included in the first memory request.

4. The apparatus of claim 1, wherein the at least some of the plurality of IP blocks comprise latency sensitive devices.

5. The apparatus of claim 1, further comprising an interface logic coupled between a first IP block and the fabric, the interface logic including the deadline logic associated with the first IP block.

6. The apparatus of claim 5, wherein the deadline logic is to associate a first order identifier with a first memory request to indicate a first priority of the first memory request, and to communicate the first memory request further including the first order identifier, wherein the first order identifier is to indicate that data for a first group of memory requests associated with the first order identifier are to be returned in order.

7. The apparatus of claim 6, wherein the deadline logic is to associate a second order identifier with a second memory request to indicate a second priority of the second memory request and to communicate the second memory request further including the second order identifier, wherein the second priority is greater than the first priority and the fabric is to handle the second memory request out of order and ahead of the first memory request based on the second order identifier, to enable data for the second memory request to be returned out of order and ahead of data for the first memory request, and in order and after data for a third memory request associated with the second order identifier is received, the third memory request communicated before the second memory request.

8. The apparatus of claim 6, wherein the deadline logic is to generate the deadline value based on a latency requirement for the first memory request of the first IP block and a global timer value received from the fabric.

9. The apparatus of claim 8, wherein the deadline value comprises a future absolute time.

10. The apparatus of claim 1, wherein the deadline logic is to calculate a first deadline value for a read request based at least in part on the global timer value from the fabric, a number of entries in a first data buffer of a first device of the plurality of IP blocks, and an access rate of the first data buffer.

11. The apparatus of claim 1, wherein the deadline logic is to calculate a first deadline value for a read request based at least in part on the global timer value from the fabric for a first memory request associated with a first buffer entry, a number of entries in a first buffer of a first device of the plurality of IP blocks, and an access rate of the first buffer.

12. The apparatus of claim 1, wherein the deadline logic includes a configuration register to store a latency value, and wherein the deadline logic is to generate the deadline value based on the global timer value from the fabric and the latency value.

13. A method comprising:
generating a first memory request in a device of a plurality of devices coupled to a shared memory fabric of a system on chip (SoC);
calculating a first deadline value for the first memory request in the device, the first deadline value based at least in part on a global timer value received from the shared memory fabric, the first deadline value to indicate a maximum latency before completion of the first memory request;
associating a first order identifier with the first memory request, the first order identifier to indicate that data for the first memory request can be returned out of order with regard to data for a second memory request including a second order identifier and in order with regard to data for a third memory request including the first order identifier; and
sending the first memory request to the shared memory fabric, the first memory request including the first deadline value and the first order identifier.

14. The method of claim 13, wherein the shared memory fabric forwards the first memory request to a first arbiter of the shared memory fabric based on the first deadline value and a latency threshold, performs an arbitration in the first arbiter between a first plurality of memory requests including the first memory request based at least in part on the deadline values of the plurality of memory requests and forwards a winner memory request of the first plurality of memory requests to a final arbiter of the shared memory fabric.

15. The method of claim 14, further comprising determining if a memory coupled to the shared memory fabric is in a self-refresh state, and if so determining whether to cause the memory to exit the self-refresh state based at least in part on the deadline value of the winner memory request.

16. The method of claim 13, further comprising determining if a memory coupled to the shared memory fabric is in a self-refresh state, and if so determining whether to cause the memory to exit the self-refresh state based at least in part on comparison of a number of pending requests to a first threshold.

17. A system on chip comprising:
a plurality of cores to independently execute instructions;
a plurality of graphics engines to independently execute graphics operations;
a first content rendering device corresponding to a first latency sensitive device, the first content rendering device of a third party vendor different than a vendor of the system on chip;
a second content rendering device corresponding to a second latency sensitive device, the second content rendering device including a second deadline logic to generate a second deadline value associated with a second memory request to indicate a maximum latency requested by the second content rendering device prior to completion of the second memory request, the second memory request including the second deadline value;
a fabric coupled to the plurality of cores, the plurality of graphics engines, the first and second content rendering devices and a memory controller; and
a first interface logic coupled between the first content rendering device and the fabric, the first interface logic including a first deadline logic to generate a first deadline value associated with a first memory request to indicate a maximum latency requested by the first content rendering device prior to completion of the first memory request, the first memory request including the first deadline value.

18. The system on chip of claim 17, wherein the fabric is to receive memory requests from the plurality of cores, the plurality of graphics engines and the first and second content rendering devices, and to arbitrate between the memory requests based at least in part on the deadline value of the memory requests from the first and second content rendering devices.

19. The system on chip of claim 17, further comprising a repeater buffer coupled between the first interface logic and the fabric, and a control logic to cause the first deadline value stored in a first entry of the repeater buffer to be updated to a third deadline value responsive to an incoming request from the first content rendering device having third deadline value.

20. An apparatus comprising:
a fabric to couple between a plurality of intellectual property (IP) blocks of a semiconductor device and a memory controller, the fabric to receive a plurality of memory requests from the plurality of IP blocks, wherein a memory request received from a first IP block is to include a deadline value determined by the first IP block to indicate a maximum latency before completion of the memory request and an order identifier to indicate a priority of the memory request, and wherein the fabric is to arbitrate between the plurality of memory requests based at least in part on the deadline value and the order identifier of the memory request, and to handle memory requests from the first IP block having the same order identifier in order and out of order with respect to one or more other memory requests from the first IP block having a different order identifier, the memory requests from the first IP block having a deadline value and an order identifier.

21. The apparatus of claim 20, wherein the fabric comprises:
an admit arbiter to receive the plurality of memory requests and to select one of the plurality of memory requests to provide to a memory scheduler arbiter; and
the memory scheduler arbiter coupled to the admit arbiter to select a first memory request from a group of memory requests to provide to the memory controller.

22. The apparatus of claim 21, wherein the admit arbiter includes a first arbiter to receive memory requests from a first subset of the plurality of IP blocks and a first portion of the plurality of memory requests from a second subset of the plurality of IP blocks, and a second arbiter to receive a second portion of the plurality of memory requests from the second subset of the plurality of IP blocks.

23. The apparatus of claim 22, wherein the second subset of the plurality of IP blocks comprise latency sensitive devices.

24. The apparatus of claim 23, wherein the second arbiter is further to receive a deadline value with each of the second portion of the plurality of memory requests received from the second subset of the plurality of IP blocks.

25. The apparatus of claim 22, wherein the admit arbiter is controllable to operate in a first mode in which memory requests from the second arbiter are selected over memory requests from the first arbiter, and a second mode in which M memory requests from the first arbiter are selected after N memory requests from the second arbiter are selected, wherein M and N are obtained from a configuration register.

26. The apparatus of claim 20, wherein the fabric is to receive a second memory request with a second order identifier, wherein when the second priority is greater than the priority, the fabric is to handle the second memory request out of order and ahead of the of the memory request.

27. The apparatus of claim 26, wherein the fabric is to handle the second memory request out of order based on the second order identifier.

28. The apparatus of claim 20, wherein the fabric is to reorder a first memory request having a first order identifier from a first IP block ahead of a second memory request having a second order identifier from the first IP block, based on the first and second order identifiers.

29. The apparatus of claim 20, wherein the apparatus comprises a system on a chip (SoC) incorporated in a user equipment touch-enabled device.

* * * * *